(12) United States Patent
Banning

(10) Patent No.: US 8,057,589 B2
(45) Date of Patent: *Nov. 15, 2011

(54) PHASE CHANGE INKS

(75) Inventor: Jeffrey H. Banning, Hillsboro, OR (US)

(73) Assignee: Xerox Corporation, Norwalk, CT (US)

( * ) Notice: Subject to any disclaimer, the term of this patent is extended or adjusted under 35 U.S.C. 154(b) by 771 days.

This patent is subject to a terminal disclaimer.

(21) Appl. No.: 11/643,053

(22) Filed: Dec. 21, 2006

(65) Prior Publication Data

US 2008/0152824 A1    Jun. 26, 2008

(51) Int. Cl.
  *C09D 11/02* (2006.01)
  *C09D 11/12* (2006.01)
  *B05D 5/00* (2006.01)
(52) U.S. Cl. .............. 106/31.29; 106/31.49; 106/31.47; 106/31.77; 106/31.78; 427/466; 430/270.1
(58) Field of Classification Search ................. 106/31
  See application file for complete search history.

(56) References Cited

U.S. PATENT DOCUMENTS

| | | | |
|---|---|---|---|
| 3,653,932 A | 4/1972 | Berry et al. | |
| 4,390,369 A | 6/1983 | Merritt et al. | |
| 4,484,948 A | 11/1984 | Merritt et al. | |
| 4,684,956 A | 8/1987 | Ball | |
| 4,851,045 A | 7/1989 | Taniguchi | |
| 4,889,560 A | 12/1989 | Jaeger et al. | |
| 4,889,761 A | 12/1989 | Titterington et al. | |
| 5,006,170 A | 4/1991 | Schwarz et al. | |
| 5,151,120 A | 9/1992 | You et al. | |
| 5,221,335 A | 6/1993 | Williams et al. | |
| 5,372,852 A | 12/1994 | Titterington et al. | |
| 5,380,842 A * | 1/1995 | Itoh et al. ............... | 540/128 |
| 5,496,879 A | 3/1996 | Griebel et al. | |
| 5,621,022 A | 4/1997 | Jaeger et al. | |
| 6,087,492 A | 7/2000 | Wolleb | |
| 6,472,523 B1 | 10/2002 | Banning et al. | |
| 6,476,219 B1 | 11/2002 | Duff et al. | |
| 6,726,755 B2 | 4/2004 | Titterington et al. | |
| 7,270,703 B2* | 9/2007 | Tateishi et al. ........... | 106/31.49 |
| 7,378,220 B2 | 5/2008 | Saito | |
| 2003/0138728 A1* | 7/2003 | Saito ...................... | 430/270.15 |
| 2004/0261656 A1* | 12/2004 | Wu et al. .................. | 106/31.29 |
| 2004/0261657 A1* | 12/2004 | Wu et al. .................. | 106/31.29 |
| 2005/0014093 A1* | 1/2005 | Watanabe et al. ........... | 430/270.1 |

FOREIGN PATENT DOCUMENTS

| | | | |
|---|---|---|---|
| EP | 0 206 286 B1 | 5/1990 | |
| EP | 0 187 352 B1 | 6/1991 | |
| WO | WO 94/04619 | 3/1994 | |
| WO | WO 03/000811 | * | 1/2003 |

OTHER PUBLICATIONS

Lo et al. Synthesis, 2005,(7), 1141-1147.*
English abstract for DE4205636.
English abstract for DE4205713.
Copending U.S. Appl. No. 11/643,054, filed Dec. 21, 2006, entitled "Colorant Compounds," by Jeffrey H. Banning.
A. Sastre, B. Del Rey, and T. Torres, "Synthesis of Novel Unsymmetrically Substituted Push-Pull Phthalocyanines," *J. Org. Chem.*, vol. 61, No. 24, p. 8591 (1996).
Angela Sastre et al., Synthesis of Novel Unsymmetrically Substituted Push-Pull Phthalocyanines, J. Org. Chem., 1996, 61, pp. 8591-8597.
Office Action Mailed Apr. 1, 2009 for co-pending U.S. Appl. No. 11/643,054, filed Dec. 21, 2006, entitled "Colorant Compounds," of Jeffrey H. Banning.
Office Action Mailed Dec. 9, 2009 for co-pending U.S. Appl. No. 11/643,054, filed Dec. 21, 2006, entitled "Colorant Compounds," of Jeffrey H. Banning.
Office Action Mailed Apr. 27, 2010 for co-pending U.S. Appl. No. 11/643,054, filed Dec. 21, 2006, entitled "Colorant Compounds," of Jeffrey H. Banning.

* cited by examiner

*Primary Examiner* — Melvin Mayes
*Assistant Examiner* — Yun Qian

(57) ABSTRACT

Disclosed is a phase change ink composition comprising a phase change ink carrier and a colorant compound of the formula

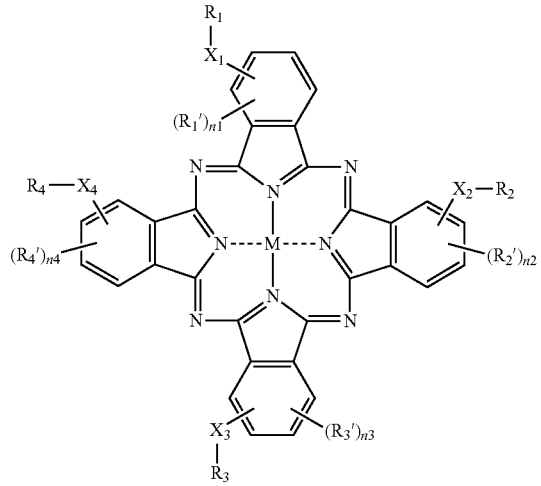

wherein $X_1$, $X_2$, $X_3$, and $X_4$ each, independently of the others, are —S—, —S(=O)—, or —S(=O)$_2$—, $R_1$, $R_2$, $R_3$, and $R_4$ each, independently of the others, are alkyl, aryl, arylalkyl, or alkylaryl, $R_1'$, $R_2'$, $R_3'$, and $R_4'$ each, independently of the others, are substituents, $n_1$, $n_2$, $n_3$, and $n_4$ each, independently of the others, are 0, 1, 2, or 3, and M is an atom or group of atoms capable of bonding to the central cavity of a phthalocyanine molecule, wherein axial ligands optionally can be attached to M. Also disclosed is a radiation curable ink composition comprising (a) an ink vehicle, said ink vehicle comprising at least one radically curable monomer compound, and this colorant compound.

21 Claims, No Drawings

PHASE CHANGE INKS

BACKGROUND

Disclosed herein are phase change inks. More specifically, disclosed herein are phase change inks containing phthalocyanine colorant compounds. One embodiment is directed to a phase change ink composition comprising a phase change ink carrier and a colorant compound of the formula

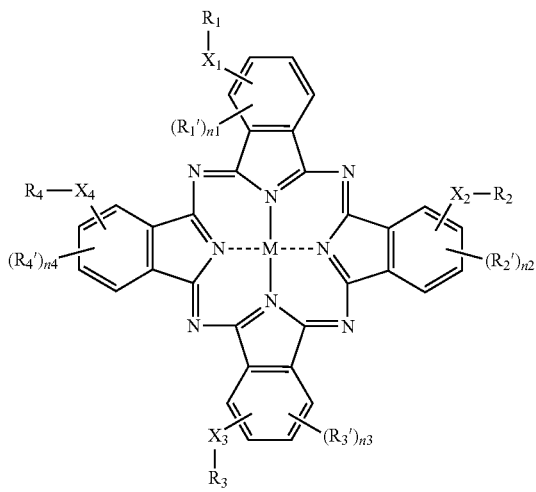

wherein $X_1$, $X_2$, $X_3$, and $X_4$ each, independently of the others, are

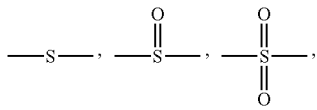

or
$R_1$, $R_2$, $R_3$, and $R_4$ each, independently of the others, are alkyl groups, aryl groups, arylalkyl groups, or alkylaryl groups, $R_1'$, $R_2'$, $R_3'$, and $R_4'$ each, independently of the others, are substituents, $n_1$, $n_2$, $n_3$, and $n_4$ each, independently of the others, are 0, 1, 2, or 3, and M is an atom or group of atoms capable of bonding to the central cavity of a phthalocyanine molecule, wherein axial ligands optionally can be attached to M.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking and industrial marking and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Pat. No. 6,472,523 (Banning et al.), U.S. Pat. No. 6,726,755 (Titterington et al.), and U.S. Pat. No. 6,476,219 (Duff et al.), the disclosures of each of which are incorporated herein by reference, disclose a compound of the formula

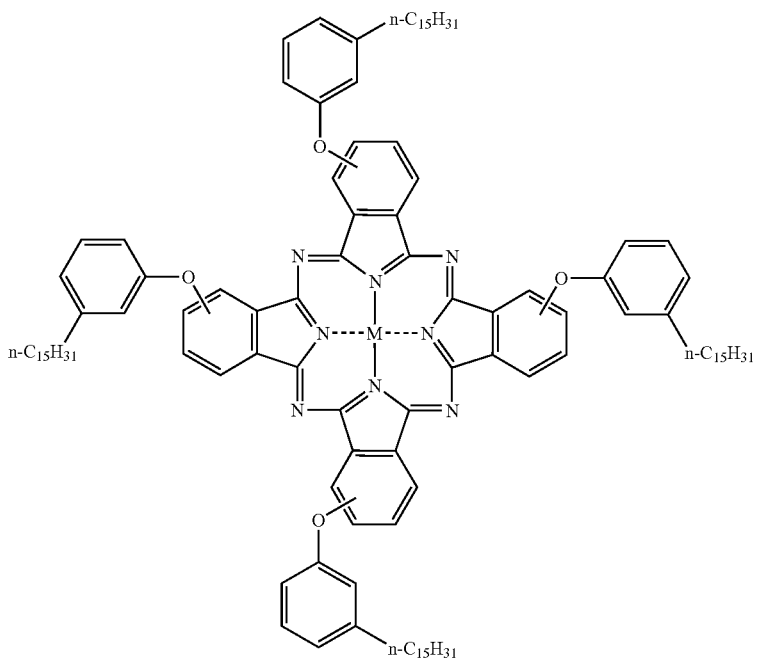

wherein M is an atom or group of atoms capable of bonding to the central cavity of a phthalocyanine molecule, wherein axial ligands optionally can be attached to M. U.S. Pat. No. 6,726,755 further discloses a phase change ink composition comprising a phase change ink carrier and this colorant compound. U.S. Pat. No. 6,476,219 further discloses methods for preparing these compounds.

"Synthesis of Novel Unsymmetrically Substituted Push-Pull Phthalocyanines," A. Sastre, B. del Rey, and T. Torres, *J. Org. Chem.*, Vol. 61, No. 24, p. 8591 (1996), the disclosure of which is totally incorporated herein by reference, discloses the synthesis and characterization of novel non-centrosymmetrically push-pull substituted metal-free phthalocyanines. The compounds had different donor (dialkoxy, tert-butyl, methyl, p-tolylthio) and/or attractor (p-tolylsulfinyl, p-tolylsulfonyl, nitro) functional groups, were soluble in organic solvents, and were especially designed to study their second- and third-order nonlinear optical properties.

U.S. Pat. No. 6,087,492 (Wolleb), the disclosure of which is totally incorporated herein by reference, discloses a phthalocyanine or its metal complex of a divalent metal, oxometal, halogenometal, or hydroxymetal, which comprises at least one unsubstituted or substituted formyl, carbonyl, hydroxymethyl, or carboxyl group which is attached at the peripheral carbon skeleton. These phthalocyanines or their derivatives are used in recording layers of optical recording media. There is also claimed a novel process for the preparation of some of these compounds corresponding to the formula

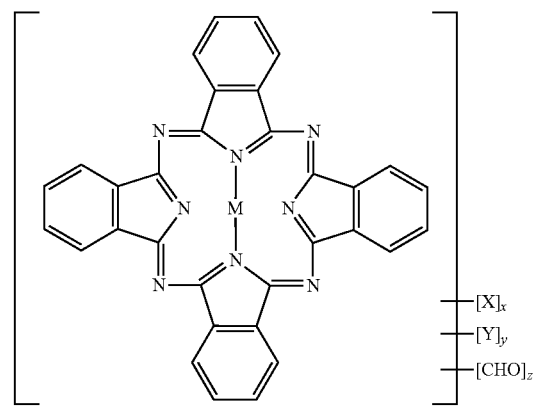

wherein M is a divalent metal, oxometal, halogenometal, or hydroxymetal, or two hydrogen atoms, X is halogen, or 2X in vicinal position on a phenyl ring form together a —C=C—C=C— bridge so that an additional phenyl ring is obtained, Y is —OR$_1$, —OOCR$_2$, —NHR$_1$, —N(R$_1$)R$_2$, or —SR$_1$, x is 0 or a number from 1 to 8, y depending on z is a number from z to 4, and z is a number from 1 to 4, by reacting a compound of the formula

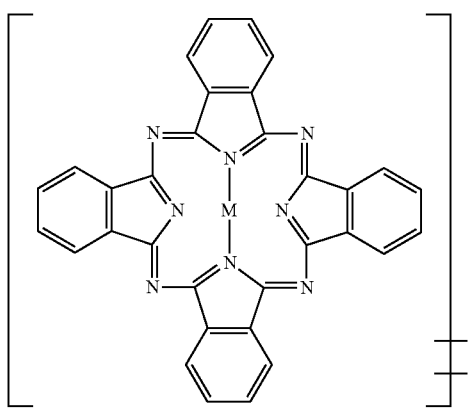

wherein M, X, Y, x, and y are as defined above, with z moles each of dimethylformamide and phosphoryl chloride.

While known compositions and processes are suitable for their intended purposes, a need remains for improved colorant compositions. In addition, a need remains for improved phthalocyanine compositions. Further, a need remains for colorants suitable for use in phase change inks. Additionally, a need remains for colorants that enable good to excellent lightfastness. There is also a need for improved colorants having improved cyan color for primary subtractive imaging. In addition, there is a need for improved colorants having high tinctorial power or spectral strength. Further, there is a need for improved cyan phase change ink colorants that are highly thermally stable in ink compositions for several weeks in air at temperatures exceeding 140° C. Additionally, there is a need for phase change ink colorants with low diffusion characteristic that will not bleed into inks containing other colorants. A need also remains for colorants with good to excellent lightfastness that are compatible with phase change ink vehicles. In addition, a need remains for colorants suitable for use in phase change inks that exhibit reduced or no variation in color over the life of the ink in the printer. Further, a need remains for colorants suitable for use in phase change inks that exhibit reduced or no variation in color subsequent to being deposited in imagewise fashion on substrates. Additionally, a need remains for colorants that have no carcinogenic or mutagenic effects. There is also a need for colorants that, when dissolved in phase change ink carriers, do not leave residues of material that might otherwise complicate filtration efficiency. In addition, there is a need for colorants that can react with other unsaturated moieties in ink carriers to enable radiation curable inks. In addition, there is a need for colorants the hue of which can be finely tuned.

SUMMARY

Disclosed herein is a phase change ink composition comprising a phase change ink carrier and a colorant compound of the formula

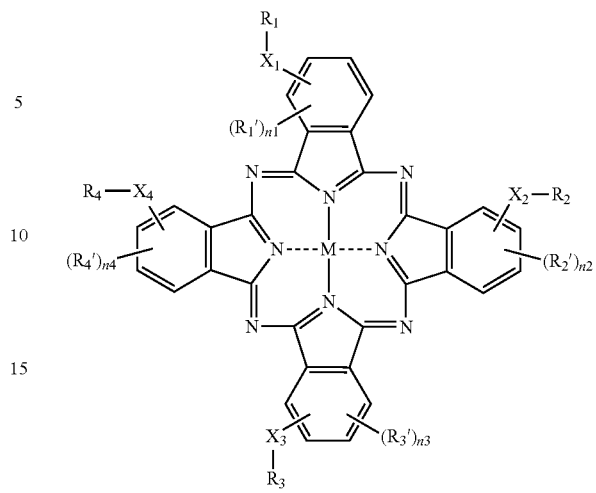

wherein $X_1$, $X_2$, $X_3$, and $X_4$ each, independently of the others, are

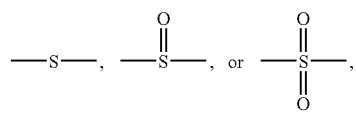

$R_1$, $R_2$, $R_3$, and $R_4$ each, independently of the others, are alkyl groups, aryl groups, arylalkyl groups, or alkylaryl groups, $R_1'$, $R_2'$, $R_3'$, and $R_4'$ each, independently of the others, are substituents, $n_1$, $n_2$, $n_3$, and n4 each, independently of the others, are 0, 1, 2, or 3, and M is an atom or group of atoms capable of bonding to the central cavity of a phthalocyanine molecule, wherein axial ligands optionally can be attached to M.

DETAILED DESCRIPTION

The colorant compounds disclosed herein are of the formula

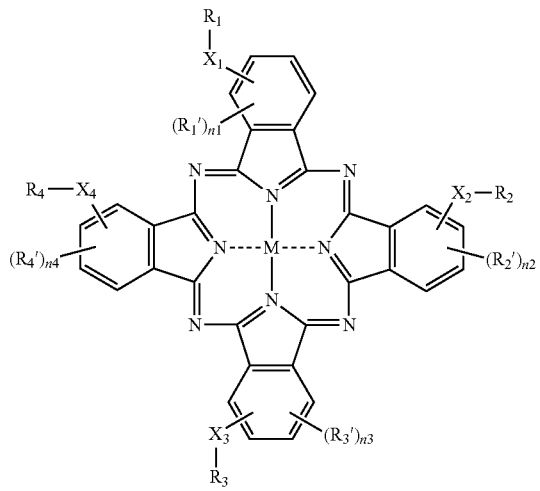

wherein $X_1$, $X_2$, $X_3$, and $X_4$ each, independently of the others, are

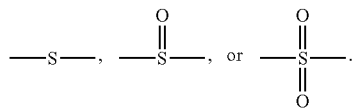

$R_1$, $R_2$, $R_3$, and $R_4$ each, independently of the others, are (i) alkyl groups (including linear and branched, cyclic and acyclic, saturated and unsaturated, and substituted and unsubstituted alkyl groups, and wherein hetero atoms, such as oxygen, nitrogen, sulfur, silicon, phosphorus, boron, and the like either may or may not be present in the alkyl group), in one embodiment with at least about 8 carbon atoms, in another embodiment with at least about 10 carbon atoms, and in yet another embodiment with at least about 12 carbon atoms, and in one embodiment with no more than about 100 carbon atoms, in another embodiment with no more than about 50 carbon atoms, and in yet another embodiment with no more than about 18 carbon atoms, although the number of carbon atoms can be outside of these ranges, (ii) aryl groups (including substituted and unsubstituted aryl groups, and wherein hetero atoms, such as oxygen, nitrogen, sulfur, silicon, phosphorus, boron, and the like either may or may not be present in the aryl group), in one embodiment with at least about 5 carbon atoms, and in another embodiment with at least about 6 carbon atoms, and in one embodiment with no more than about 20 carbon atoms, in another embodiment with no more than about 16 carbon atoms, and in yet another embodiment with no more than about 10 carbon atoms, although the number of carbon atoms can be outside of these ranges, (iii) arylalkyl groups (including substituted and unsubstituted arylalkyl groups, wherein the alkyl portion of the arylalkyl group can be linear or branched, cyclic or acyclic, and saturated or unsaturated, and wherein hetero atoms, such as oxygen, nitrogen, sulfur, silicon, phosphorus, boron, and the like either may or may not be present in either the aryl or the alkyl portion of the arylalkyl group) in one embodiment with at least about 6 carbon atoms, in another embodiment with at least about 7 carbon atoms, in yet another embodiment with at least about 8 carbon atoms, and in still another embodiment with at least about 9 carbon atoms, and in one embodiment with no more than about 100 carbon atoms, in another embodiment with no more than about 50 carbon atoms, and in yet another embodiment with no more than about 18 carbon atoms, although the number of carbon atoms can be outside of these ranges, such as benzyl or the like, or (iv) alkylaryl groups (including substituted and unsubstituted alkylaryl groups, wherein the alkyl portion of the alkylaryl group can be linear or branched, cyclic or acyclic, and saturated or unsaturated, and wherein hetero atoms, such as oxygen, nitrogen, sulfur, silicon, phosphorus, boron, and the like either may or may not be present in either the aryl or the alkyl portion of the alkylaryl group) in one embodiment with at least about 6 carbon atoms, in another embodiment with at least about 7 carbon atoms, in yet another embodiment with at least about 8 carbon atoms, and in still another embodiment with at least about 9 carbon atoms, and in one embodiment with no more than about 100 carbon atoms, in another embodiment with no more than about 50 carbon atoms, and in yet another embodiment with no more than about 18 carbon atoms, although the number of carbon atoms can be outside of these ranges, such as tolyl or the like, wherein the substituents on the substituted and unsubstituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

$R_1'$, $R_2'$, $R_3'$, and $R_4'$ each, independently of the others, are substituents which can be (but is not limited to) (i) alkyl groups (including linear and branched, cyclic and acyclic, and saturated and unsaturated alkyl groups, and wherein the alkyl group can be either substituted or unsubstituted, and wherein hetero atoms, such as oxygen, nitrogen, sulfur, silicon, phosphorus, boron, and the like either may or may not be present in the alkyl group), in one embodiment with at least 1 carbon atom, and in one embodiment with no more than about 100 carbon atoms, in another embodiment with no more than about 50 carbon atoms, and in yet another embodiment with no more than about 18 carbon atoms, although the number of carbon atoms can be outside of these ranges, (ii) aryl groups (including substituted and unsubstituted aryl groups, and wherein hetero atoms, such as oxygen, nitrogen, sulfur, silicon, phosphorus, boron, and the like either may or may not be present in the aryl group), in one embodiment with at least about 5 carbon atoms, and in one embodiment with no more than about 20 carbon atoms, in another embodiment with no more than about 16 carbon atoms, and in yet another embodiment with no more than about 10 carbon atoms, although the number of carbon atoms can be outside of these ranges, (iii) arylalkyl groups (including substituted and unsubstituted arylalkyl groups, wherein the alkyl portion of the arylalkyl group can be linear or branched, saturated or unsaturated, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 100 carbon atoms, in another embodiment with no more than about 50 carbon atoms, and in yet another embodiment with no more than about 18 carbon atoms, although the number of carbon atoms can be outside of these ranges, such as benzyl or the like, (iv) alkylaryl groups (including substituted and unsubstituted alkylaryl groups, wherein the alkyl portion of the alkylaryl group can be linear or branched, saturated or unsaturated, cyclic or acyclic, and substituted or unsubstituted, and wherein hetero atoms, such as oxygen, nitrogen, sulfur, sili-con, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 100 carbon atoms, in another embodiment with no more than about 50 carbon atoms, and in yet another embodiment with no more than about 18 carbon atoms, although the number of carbon atoms can be outside of these ranges, such as tolyl or the like, (v) nitrile groups, (vi) nitro groups, (vii) alkoxy groups having from 1 to about 50 carbon atoms, or (viii) substituents chosen from hydroxy groups, halogen atoms, amine groups, imine groups, ammonium groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, and combinations thereof, wherein two or more substituents can be joined together to form a ring. Each of $n_1$, $n_2$, $n_3$, and $n_4$, independently of the others, are 0, 1, 2, or 3.

M is an atom or group of atoms capable of bonding to the central cavity of a phthalocyanine molecule, wherein axial ligands optionally can be attached to M. About seventy atoms or groups are known to bond in the central cavity of a phthalocyanine molecule, as disclosed in, for example, *Phthalocyanine Materials*, N. B. McKeown, Cambridge University Press (1998), Chapter 1, Table 1.1, the disclosure of which is totally incorporated herein by reference, including, but not limited to, two hydrogen, lithium, sodium, or potassium atoms; a divalent metal atom, such as beryllium, magnesium, calcium, strontium, barium, chromium, manganese, iron, cobalt, nickel, copper, zinc, tin, lead, cadmium, and the like; a divalent halometal or -metalloid group, such as chloroiron (III), chlorotitanium(III), chlorochromium(III), chloroaluminum, chlorogallium, chloroindium, chlorophosphorus(III), dichlorotitanium(IV), dichlorosilicon, dichlorogermanium, dichlorotin, and the like, as well as the corresponding fluorides, bromides, and iodides; a divalent hydroxy metal group, such as hydroxyaluminum, hydroxygallium, dihydroxysilicon, dihydroxygermanium, dihydroxytin, and the like; a divalent oxo-metal group, such as oxo-molybdenum(IV), oxo-vanadium(IV), oxo-titanium(IV), and the like; a divalent metal- or metalloidal-oxyhydrocarbon group, such as alkoxy-aluminum, alkoxygallium, dialkoxysilicon, diaryloxygermanium, and the like, wherein the oxyhydrocarbon group is an oxyalkyl group, an oxyaryl group, an oxyalkylaryl group, an oxyarylalkyl group, an oxyheterocyclic group, or mixtures thereof, and typically (although not necessarily) contains from one to about twenty carbon atoms; and the like, as well as mixtures thereof.

It is believed that in most instances the colorant molecules are obtained as mixtures of four isomeric forms as illustrated below, wherein the $C_{4h}$, $D_{2h}$, $C_{2v}$, and $C_s$ isomers are present in the approximate ratio of, respectively, about 1:1:2:4:

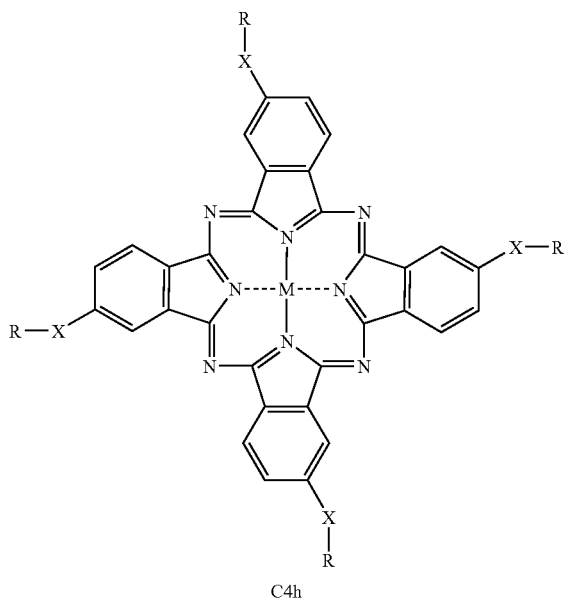

C4h

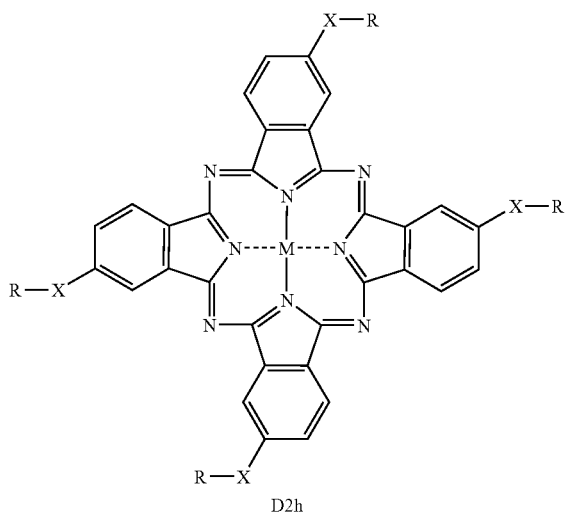

D2h

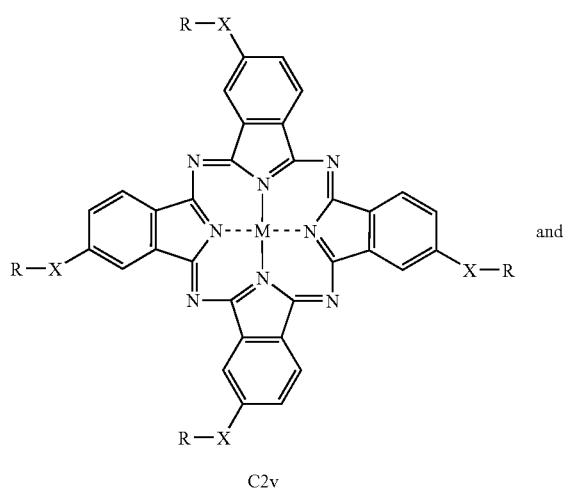

and

C2v

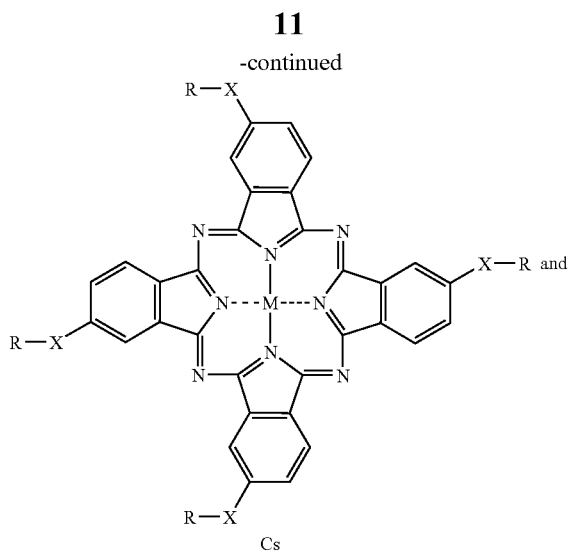

Cs

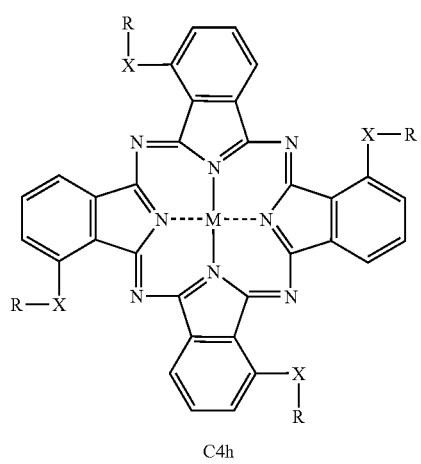

C4h

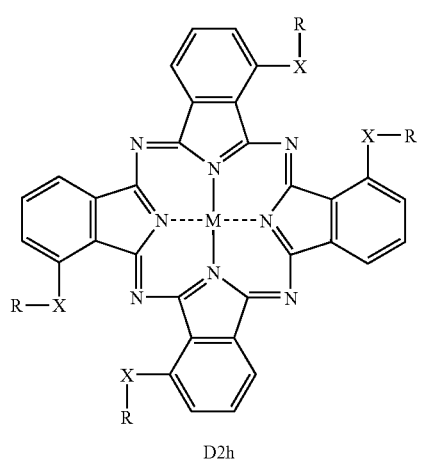

D2h

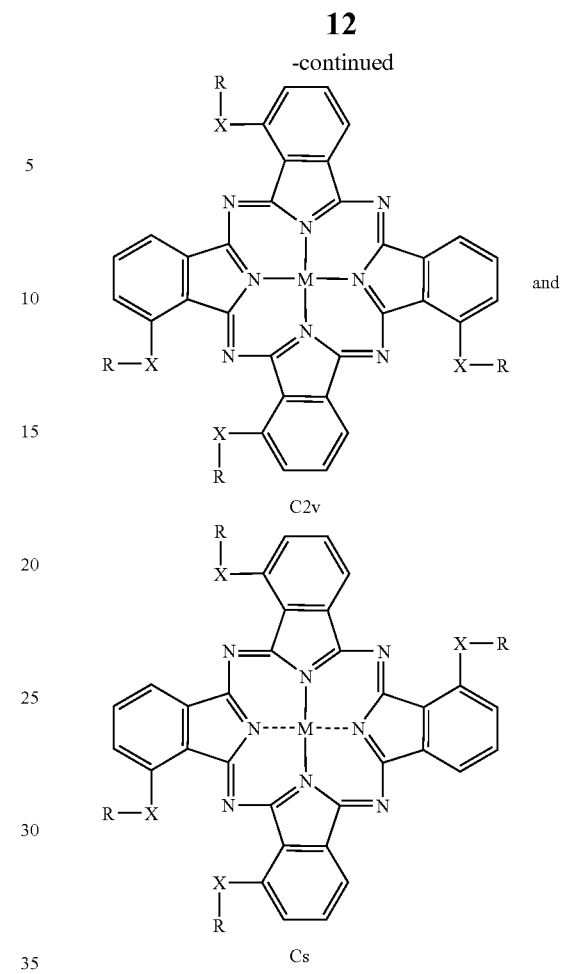

C2v

Cs

The colorant molecules disclosed herein can be prepared by any desired or effective process. In one embodiment, the process is carried out by first preparing the alkylaryl sulfide adduct of phthalonitrile:

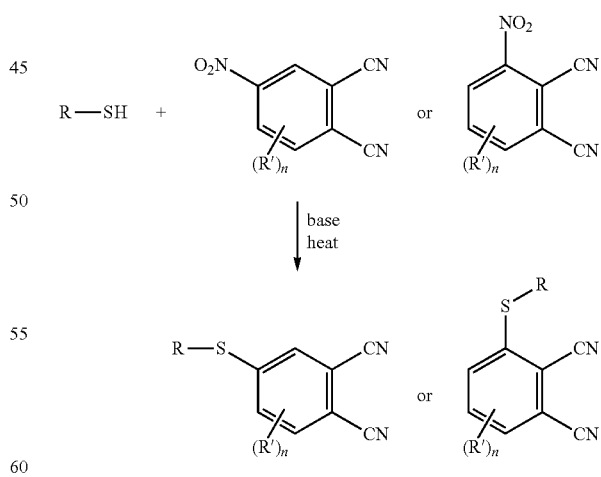

This process can be carried out by reacting the desired thiol with 3- or 4-nitrophthalonitrile in the presence of a base. Examples of suitable thiols include dodecyl mercaptan, t-dodecylmercaptan, octadecylmercaptan, and the like.

Suitable bases include both organic and inorganic bases. Examples of organic bases include (but are not limited to)

trialkyl amines (including triethylamine, tripropylamine, tributylamine, and the like), piperidine, 1,4-diazabicyclo (2.2.2)octane, and the like, as well as mixtures thereof. Examples of inorganic bases include (but are not limited to) lithium hydroxide, sodium hydroxide, potassium hydroxide, lithium carbonate, sodium carbonate, potassium carbonate, lithium hydride, sodium hydride, potassium hydride, lithium alkoxide, sodium alkoxide, potassium alkoxide (wherein the alkoxide can be, but is not limited to, methoxide, ethoxide, propoxide, butoxide (including t-butoxide), and the like), and the like, as well as mixtures thereof.

The reactants are dissolved in any solvent capable of dissolving the reactants, such as methanol, ethanol, propanol, butanol, dioxane, acetone, toluene, nitrobenzene, dimethyl formamide, dimethyl sulfoxide, 1-methyl-2-pyrrolidinone, 1-cyclohexyl-2-pyrrolidinone, sulfolane, and the like, as well as mixtures thereof. The solids content of the reaction mixture in one embodiment is at least about 0.5 parts by weight solvent per every 1 part by weight thiol, and in another embodiment is at least about 2 parts by weight solvent per every 1 part by weight thiol, and in one embodiment is no more than about 20 parts by weight solvent per every 1 part by weight thiol, and in another embodiment is no more than about 6 parts by weight solvent per every 1 part by weight thiol, although the solids content can be outside of these ranges.

In one embodiment, the thiol and the base are added to the solvent, followed by heating the reaction mixture, in one embodiment to a temperature of at least about 30° C., and in another embodiment to a temperature of at least about 80° C., and in one embodiment to a temperature of no more than about 150° C., and in another embodiment to a temperature of no more than about 120° C., although the temperature can be outside of these ranges, for a period of time in one embodiment of at least about 0.25 hour, and in another embodiment of at least about 0.5 hour, and in one embodiment of no more than about 8 hours, and in another embodiment of no more than about 2 hours, although the time can be outside of these ranges. By allowing the thiol and the base to react first, the corresponding salt is formed; optionally, the 3- or 4-nitrophthalonitrile can be added with the thiol and the base in a single step, in which case the preheating step is eliminated.

Thereafter, the 3- or 4-nitrophthalonitrile is added to the reaction mixture and the reaction mixture is then heated, in one embodiment to a temperature of at least about 30° C., and in another embodiment to a temperature of at least about 70° C., and in one embodiment to a temperature of no more than about 150° C., and in another embodiment to a temperature of no more than about 110° C., although the temperature can be outside of these ranges, for a period of time in one embodiment of at least about 0.25 hour, and in another embodiment of at least about 0.5 hour, and in one embodiment of no more than about 24 hours, and in another embodiment of no more than about 4 hours, although the time can be outside of these ranges.

Thereafter, the reaction mixture is cooled, in one embodiment to a temperature of at least about 20° C., and in one embodiment to a temperature of no more than about 100° C., and in another embodiment to a temperature of no more than about 60° C., although the temperature can be outside of these ranges, followed by quenching in a precipitant solvent, such as water, methanol, mixtures thereof, and the like, by stirring the reaction solution into the precipitant solvent or vice-versa, in an amount in one embodiment of at least about 0.25 part by weight precipitant solvent per every 1 part by weight reaction solution, and in another embodiment of at least about 0.5 part by weight precipitant solvent per every 1 part by weight reaction solution, and in one embodiment of no more than about 2 parts by weight precipitant solvent per every 1 part by weight reaction solution, and in another embodiment of no more than about 10 parts by weight precipitant solvent per every 1 part by weight reaction solution, although the relative amounts can be outside of these ranges, thereby causing precipitation of the alkylaryl sulfide phthalonitrile adduct intermediate product, which can be isolated by filtration. Thereafter, the intermediate can be reslurried with water or dilute acid (for example, 2 percent wt/volume hydrochloric acid) or base (for example, 2 percent sodium hydroxide) and filtered, and then reslurried and filtered with pure water, and the process repeated until inorganic and/or organic salts are removed from the product and the filtrate is of neutral pH and has a conductivity of less than about 20 microSiemens.

If desired, the product can be further purified by slurrying it in a solvent, such as methanol, ethanol, propanol, isopropanol, acetone, N,N'-dimethylformamide, mixtures thereof, mixtures of one or more of these solvents with water, and the like, followed by isolation of the product by filtration, which process may remove minor organic contaminants from the alkylaryloxyphthalonitrile intermediate. Thereafter, the solid product can, if desired, be dried by heating under vacuum at a temperature in one embodiment of at least about 20° C., and in another embodiment of at least about 25° C., and in one embodiment of no more than about 100° C., and in another embodiment of no more than about 50° C., although the temperature can be outside of these ranges, for a period in one embodiment of at least about 1 hour, and in one embodiment of no more than about 72 hours, although the time can be outside of these ranges. Optionally, if desired, the product can be recrystallized by heating in a solvent, such as methanol, ethanol, isopropanol, and the like, cooling to about 0° C., and filtering and drying the crystals.

For the synthesis of the alkylaryl sulfide adduct of phthalonitrile, the molar ratio of thiol to 3- or 4-nitrophthalonitrile in one embodiment is at least about 1:1, and in one embodiment is no more than about 3:1, and in another embodiment is no more than about 1.5:1, although the molar ratio can be outside of these ranges, and the molar ratio of thiol to base in one embodiment is at least about 1:1, and in one embodiment is no more than about 3:1, and in another embodiment is no more than about 1:1 to about 1.5:1, although the molar ratio can be outside of these ranges.

In this embodiment, the second step in the synthesis of the colorant molecules entails conversion of the alkylaryl sulfide phthalonitrile adduct to the phthalocyanine:

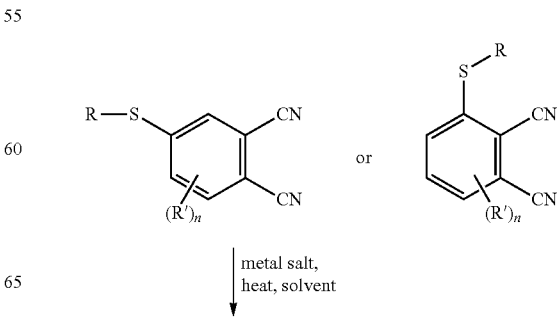

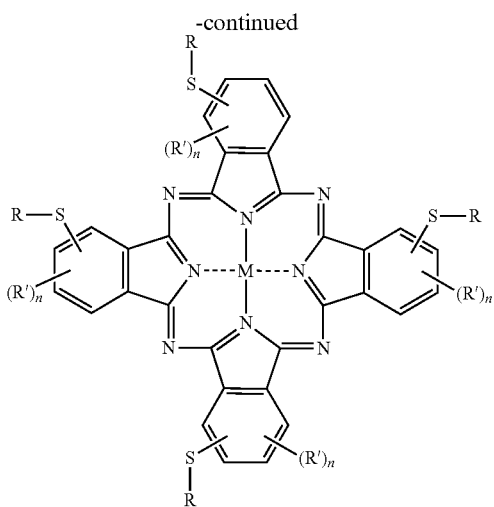

This process can be carried out by reacting the alkylaryl sulfide phthalonitrile adduct with a metal compound. Examples of suitable metal compounds include anhydrous and hydrated salts or complexes of the formula $$MX_n \cdot yH_2O$$

wherein M is a metal, such as lithium, sodium, potassium, beryllium, magnesium, calcium, scandium, titanium, zirconium, vanadium, niobium, chromium, molybdenum, manganese, rhenium, iron, ruthenium, cobalt, rhodium, nickel, palladium, platinum, copper, zinc, cadmium, aluminum, gallium, indium, silicon, germanium, tin, lead, and the like, X is an anion, such as a carboxylate-containing moiety, such as formate, acetate, acetoacetate, propionate, butyrate, benzoate, and the like, an alkoxide, such as methoxide, ethoxide, isopropoxide, or the like, acetyl acetonate, a halide atom, such as fluoride, chloride, bromide, or iodide, sulfate, alkyl sulfonate, aryl sulfonate, nitrate, nitrite, phosphate, and the like, n is a number representing the valence of the metal, and y is an integer of from 0 to 10. Specific examples include (but are not limited to) anhydrous copper chloride, hydrated copper chloride, anhydrous copper acetate, hydrated copper acetate, anhydrous copper sulfate, hydrated copper sulfate, anhydrous copper nitrate, hydrated copper nitrate, anhydrous copper bromide, hydrated copper bromide, and the like, as well as mixtures thereof.

The alkylaryl sulfide phthalonitrile adduct, metal compound, and a solvent, such as ethylene glycol, amyl alcohol, hexanol, heptanol, tetralin, decalin, ISOPAR® (refined mineral spirits solvents available from Exxon), xylene, tributyl amine, N,N-dimethylaniline, quinoline, 1-chloronaphthalene, trialkanolamines, monoalkyl dialkanolamines, dialkyl monoalkanolamines (such as 2-dimethylaminoethanol, 2-diethylaminoethanol, 2-dimethylamino-1-propanol, and the like), dimethylsulfoxide, N,N-dimethylformamide, N,N-dimethylacetamide, 1-methyl-2-pyrrolidinone, N-cyclohexyl-2-pyrrolidinone, sulfolane, and the like, as well as mixtures thereof, are combined to form the reaction mixture. The solids content of the reaction mixture in one embodiment is at least about 3 parts by weight alkylaryl sulfide phthalonitrile adduct per every 100 parts by weight solvent, and in another embodiment is at least about 10 parts by weight alkylaryl sulfide phthalonitrile adduct per every 100 parts by weight solvent, and in one embodiment is no more than about 60 parts by weight alkylaryl sulfide phthalonitrile adduct per every 100 parts by weight solvent, and in another embodiment is no more than about 30 parts by weight alkylaryl sulfide phthalonitrile adduct per every 100 parts by weight solvent, although the solids content can be outside of these ranges.

The reaction mixture is heated to reflux. Reflux temperature in one embodiment is at least about 80° C., and in another embodiment is at least about 140° C., and in one embodiment is no more than about 250° C., and in another embodiment is no more than about 190° C., although the temperature can be outside of these ranges.

The reaction mixture is refluxed for a period of time in one embodiment of at least about 1 hour, and in another embodiment of at least about 2 hours, and in one embodiment of no more than about 24 hours, and in another embodiment of no more than about 8 hours, although the time can be outside of these ranges.

Thereafter, the reaction is cooled to a temperature in one embodiment of at least about 25° C., and in another embodiment of at least about 50° C., and in one embodiment of no more than about 150° C., and in another embodiment of no more than about 100° C., although the temperature can be outside of these ranges, filtered, typically through a filter of paper, glass fiber, polypropylene, GORETEX®, and the like, although other methods of filtration can also be used, and washed with a solvent, such as water, acetone, methyl ethyl ketone, methyl isobutyl ketone, methanol, ethanol, propanol, butanol, dimethyl formamide, dimethyl sulfoxide, N-methyl pyrrolidinone, sulfolane, and the like, as well as mixtures thereof. If desired, the precipitated blue or green solids can then again be filtered, slurried with a solvent, such as acetone, methyl ethyl ketone, methyl isobutyl ketone, methanol, ethanol, propanol, butanol, dimethyl formamide, dimethyl sulfoxide, N-methyl pyrrolidinone, sulfolane, and the like, as well as mixtures thereof, in relative amounts in one embodiment of at least about 3 parts by weight solvent per every 1 part by weight product, and in one embodiment of no more than about 100 parts by weight solvent per every 1 part by weight product, although the relative amounts can be outside of these ranges, for a period of time in one embodiment of at least about 0.5 hour, and in one embodiment of no more than about 24 hours, although the time can be outside of these ranges, and at a temperature in one embodiment of at least about 25° C., and in another embodiment of at least about 50° C., and in one embodiment of no more than about 200° C., and in another embodiment of no more than about 100° C., although the temperature can be outside of these ranges. The product is then filtered again and dried.

If desired, a catalyst or reaction promoter can also be included in the reaction mixture. Examples of suitable catalysts or reaction promoters include trialkanolamines, dialkyl monoalkanolamines, monoalkyl dialkanolamines, and the like, wherein the alkyl groups, which can be connected to the nitrogen atom through a primary, secondary, or tertiary carbon atom, in one embodiment have from 1 to about 6 carbon atoms, and in another embodiment have from 1 to about 3 carbon atoms, although the number of carbon atoms can be outside of these ranges, including (but not limited to) methyl, ethyl, n-propyl, isopropyl, and the like, and wherein the alkanol groups, which can be primary, secondary, or tertiary alkanols and can be connected to the nitrogen atom through a primary, secondary, or tertiary carbon atom, in one embodiment have from about 2 to about 6 carbon atoms, and in another embodiment have from about 2 to about 3 carbon atoms, although the number of carbon atoms can be outside of these ranges, including (but not limited to) 2-hydroxyethyl, 2-hydroxypropyl, 3-hydroxypropyl, and the like, with specific examples of suitable catalysts or reaction promoters including (but not limited to) 2-diethylaminoethanol, 2-dimethylaminoethanol, 2-dimethylamino-1-propanol, and the like, as well as mixtures thereof.

Suitable catalysts or reaction promoters also include ammonia-releasing compounds. Suitable ammonia-releasing compounds are any ammonium salts that release ammonia when heated, including (but not limited to) ammonium carbonate, ammonium carbamate, ammonium bicarbonate, ammonium molybdate, urea, ammonium salts of mono- and dicarboxylic acids, including (but not limited to) formic acid, acetic acid, propionic acid, butyric acid, benzoic acid, oxalic acid, malonic acid, and the like, as well as mixtures thereof. When an ammonia releasing compound is employed as a catalyst or reaction promoter, while not required, in a specific embodiment, the reaction of the alkylaryl sulfide phthalonitrile adduct with the copper salt takes place with a two stage temperature-warming profile. The first stage entails heating the reaction mixture to an intermediate temperature, in one embodiment of at least about 80° C., and in one embodiment of no more than about 140° C., although the temperature can be outside of these ranges, and for a period of time in one embodiment of at least about 0.25 hour, and in one embodiment of no more than about 3 hours, although the time can be outside of these ranges, during which time ammonia gas is slowly released. Thereafter, the reaction mixture is heated to a final temperature, in one embodiment of at least about 120° C., and in another embodiment of at least about 140° C., and in one embodiment of no more than about 250° C., and in another embodiment of no more than about 190° C., although the temperature can be outside of these ranges, and for a period of time in one embodiment of at least about 1 hour, and in another embodiment of at least about 2 hours, and in one embodiment of no more than about 24 hours, and in another embodiment of no more than about 10 hours, although the time can be outside of these ranges.

For the synthesis of the phthalocyanine compound, the molar ratio of alkylaryl sulfide phthalonitrile adduct to metal compound in one embodiment is at least about 2:1, and in another embodiment is at least about 3:1, and in one embodiment is no more than about 10:1, and in another embodiment is no more than about 6:1, although the molar ratio can be outside of these ranges. When a catalyst or reaction promoter is used, the molar ratio of catalyst or reaction promoter to metal compound in one embodiment is at least about 0.1:1, and in another embodiment is at least about 0.5:1, and in one embodiment is no more than about 10:1, and in another embodiment is no more than about 2:1, although the molar ratio can be outside of these ranges.

In one specific embodiment, two or more catalysts or reaction promoters can be used, such as one or more from the class of alkanolamines and one or more from the class of ammonia-releasing compounds, two or more from the class of alkanolamines, two or more from the class of ammonia-releasing compounds, or the like.

Metal-free phthalocyanine can be prepared by treatment of an alkali metal phthalocyanine such as dilithium, disodium, dipotassium, beryllium, magnesium, or calcium phthalocyanine, prepared according to the above process, with a dilute aqueous or alcoholic acid. Examples of suitable acids include (but are not limited to) hydrochloric acid, phosphoric acid, sulfuric acid, nitric acid, sulfonic acids, such as alkylsulfonic, arylsulfonic, arylalkylsulfonic, and alkylarylsulfonic, wherein the alkyl portions thereof can be linear or branched, in one embodiment with from 1 to about 18 carbon atoms, although the number of carbon atoms can be outside of this range, and wherein the aryl portions thereof in one embodiment have from 6 to about 12 carbon atoms, although the number of carbon atoms can be outside of this range, carboxylic acids, such as alkylcarboxylic, arylcarboxylic, arylalkylcarboxylic, and alkylarylcarboxylic, wherein the alkyl portions thereof can be linear or branched, and wherein the carboxylic acid in one embodiment has from 1 to about 24 carbon atoms, although the number of carbon atoms can be outside of this range (such as formic, acetic, propionic, benzoic, and the like), and the like, as well as mixtures thereof. The acid is present in the water or alcohol solution in any desired or effective concentration, in one embodiment of at least about 1 percent by weight acid, and in another embodiment of at least about 2 percent by weight acid, and in one embodiment of no more than about 10 percent by weight acid, and in another embodiment of no more than about 5 percent by weight acid, although the acid concentration can be outside of these ranges. Examples of suitable alcohols include (but are not limited to) methanol, ethanol, propanol, isopropanol, ethylene glycol, and the like, as well as mixtures thereof.

Alternatively, the metal-free phthalocyanine dye can be prepared by heating a concentrated solution of alkylaryl sulfide phthalonitrile adduct in a dialkyl monoalkanolamine solvent, wherein the alkyl groups, which can be connected to the nitrogen atom through a primary, secondary, or tertiary carbon atom, in one embodiment have from 1 to about 6 carbon atoms, and in another embodiment have from 1 to about 3 carbon atoms, although the number of carbon atoms can be outside of these ranges, including (but not limited to) methyl, ethyl, n-propyl, isopropyl, and the like, and wherein the alkanol groups, which can be primary, secondary, or tertiary alkanols and can be connected to the nitrogen atom through a primary, secondary, or tertiary carbon atom, in one embodiment have from about 2 to about 6 carbon atoms, and in another embodiment have from about 2 to about 3 carbon atoms, although the number of carbon atoms can be outside of these ranges, including (but not limited to) 2-hydroxyethyl, 2-hydroxypropyl, 3-hydroxypropyl, and the like, with specific examples including 2-dimethylaminoethanol, 2-diethylaminoethanol, 2-dimethylamino-1-propanol, and the like, as well as mixtures thereof, in the presence of an ammonia-releasing compound.

The ratio by weight of alkylaryl sulfide phthalonitrile adduct to dialkyl monoalkanolamine solvent in one embodiment is at least about 10:80, and in another embodiment is at least about 25:75, and in one embodiment is no more than about 60:40, and in another embodiment is no more than about 50:50, although the relative amounts can be outside of these ranges.

Suitable ammonia-releasing compounds include those listed hereinabove with respect to catalysts or reaction promoters. The molar ratio of ammonia-releasing compound to alkylaryl sulfide phthalonitrile adduct in one embodiment is at least about 0.1 molar equivalent ammonia-releasing compound per every 1 molar equivalent of alkylaryl sulfide phthalonitrile adduct, and in another embodiment is at least about 0.5 molar equivalent ammonia-releasing compound per every 1 molar equivalent of alkylaryl sulfide phthalonitrile adduct, and in one embodiment is no more than about 5 molar equivalents ammonia-releasing compound per every 1 molar equivalent of alkylaryl sulfide phthalonitrile adduct, and in another embodiment is no more than about 2 molar equivalents ammonia-releasing compound per every 1 molar equivalent of alkylaryl sulfide phthalonitrile adduct, although the relative amounts can be outside of these ranges.

The mixture can be initially heated to a first temperature, in one embodiment of at least about 50° C., and in another embodiment of at least about 65° C., and in one embodiment of no more than about 130° C., and in another embodiment of no more than about 125° C., although the temperature can be outside of these ranges, for a period of time in one embodiment of at least about 10 minutes, and in another embodiment of at least about 20 minutes, and in one embodiment of no more than about 120 minutes, and in another embodiment of no more than about 60 minutes, although the time can be outside of these ranges, to promote slow release of ammonia, then is subsequently heated to a second temperature which is higher than the first temperature, in one embodiment of at least about 120° C., and in another embodiment of at least about 135° C., and in one embodiment of no more than about 200° C., and in another embodiment of no more than about 170° C., although the temperature can be outside of these ranges, for a period of time in one embodiment of at least about 1 hour, and in another embodiment of at least about 2 hours, and in one embodiment of no more than about 24 hours, and in another embodiment of no more than about 10 hours, although the time can be outside of these ranges.

Thereafter, the reaction mixture is cooled, in one embodiment to a temperature of at least about 25° C., and in another embodiment to a temperature of at least about 50° C., and in one embodiment to a temperature of no more than about 125° C., and in another embodiment to a temperature of no more than about 100° C., although the temperature can be outside of these ranges, and the product is separated by filtration or by decantation and washed with a solvent, such as water, acetone, methyl ethyl ketone, methyl isobutyl ketone, methanol, ethanol, propanol, butanol, dimethyl formamide, dimethyl sulfoxide, N-methyl pyrrolidinone, sulfolane, and the like, as well as mixtures thereof. If desired, the precipitated blue or green solids can then again be filtered, slurried with a solvent, such as acetone, methyl ethyl ketone, methyl isobutyl ketone, methanol, ethanol, propanol, butanol, dimethyl formamide, dimethyl sulfoxide, N-methyl pyrrolidinone, sulfolane, and the like, as well as mixtures thereof, in relative amounts in one embodiment of at least about 3 parts by weight solvent per every 1 part by weight product, and in one embodiment of no more than about 100 parts by weight solvent per every 1 part by weight product, although the relative amounts can be outside of these ranges, for a period of time in one embodiment of at least about 0.5 hour, and in one embodiment of no more than about 24 hours, although the time can be outside of these ranges, and at a temperature in one embodiment of at least about 25° C., and in another embodiment of at least about 50° C., and in one embodiment of no more than about 200° C., and in another embodiment of no more than about 100° C., although the temperature can be outside of these ranges. The product is then filtered again and dried.

If desired, the alkylaryl sulfide phthalonitrile adduct need not be isolated by addition of precipitant subsequent to its synthesis and prior to its reaction with the metal compound. In this embodiment, the reaction mixture in which the alkylaryl sulfide phthalonitrile adduct was formed can, if desired, optionally be filtered to remove any inorganic salts, followed by addition to the reaction mixture of the metal compound and, optionally, any desired reaction promoter. Thereafter, the reaction mixture is heated, to a temperature in one embodiment of at least about 120° C., and in another embodiment of at least about 140° C., and in one embodiment of no more than about 250° C., and in another embodiment of no more than about 190° C., although the temperature can be outside of these ranges, for a period of time in one embodiment of at least about 1 hour, and in another embodiment of at least about 2 hours, and in one embodiment for a period of time of no more than about 24 hours, and in another embodiment of no more than about 8 hours, although the time can be outside of these ranges. The phthalocyanine product thus formed can then be isolated as described hereinabove with respect to the process.

In one specific embodiment, the compound is of the formula

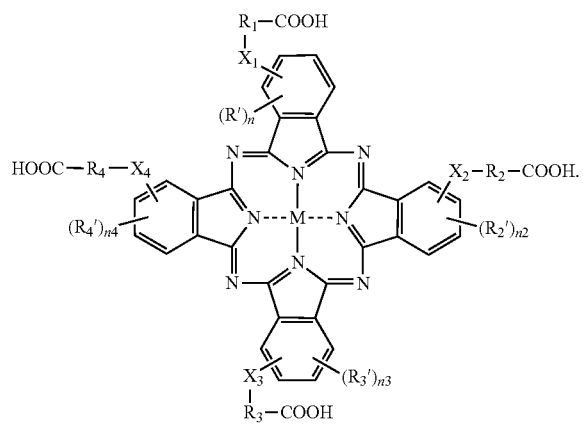

In more specific embodiments, $R_1$, $R_2$, $R_3$, and $R_4$ each are aryl groups, or arylalkyl groups or alkylaryl groups wherein the carboxylic acid group is bonded to the aryl portion thereof. In these embodiments, the carboxylate group can be further reacted to form an ester group of the formula

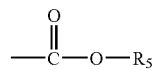

wherein $R_5$ is (i) an alkyl group (including linear and branched, cyclic and acyclic, saturated and unsaturated, and substituted and unsubstituted alkyl groups, and wherein hetero atoms, such as oxygen, nitrogen, sulfur, silicon, phosphorus, boron, and the like either may or may not be present in the alkyl group), in one embodiment with at least about 8 carbon atoms, in another embodiment with at least about 10 carbon atoms, and in yet another embodiment with at least about 12 carbon atoms, and in one embodiment with no more than about 100 carbon atoms, in another embodiment with no more than about 50 carbon atoms, and in yet another embodiment with no more than about 18 carbon atoms, although the number of carbon atoms can be outside of these ranges, (ii) an aryl group (including substituted and unsubstituted aryl groups, and wherein hetero atoms, such as oxygen, nitrogen, sulfur, silicon, phosphorus, boron, and the like either may or may not be present in the aryl group), in one embodiment with at least about 5 carbon atoms, and in another embodiment with at least about 6 carbon atoms, and in one embodiment with no more than about 20 carbon atoms, in another embodiment with no more than about 16 carbon atoms, and in yet another embodiment with no more than about 10 carbon atoms, although the number of carbon atoms can be outside of these ranges, (iii) an arylalkyl group (including substituted and unsubstituted arylalkyl groups, wherein the alkyl portion of the arylalkyl group can be linear or branched, cyclic or acyclic, and saturated or unsaturated, and wherein hetero atoms, such as oxygen, nitrogen, sulfur, silicon, phosphorus, boron, and the like either may or may not be present in either the aryl or the alkyl portion of the arylalkyl group) in one embodiment with at least about 6 carbon atoms, and in another embodiment with at least about 7 carbon atoms, and in one embodiment with no more than about 100 carbon atoms, in another embodiment with no more than about 50 carbon atoms, and in yet another embodiment with no more than about 18 carbon atoms, although the number of carbon atoms can be outside of these ranges, such as benzyl or the like, or (iv) an alkylaryl group (including substituted and unsubstituted alkylaryl groups, wherein the alkyl portion of the alkylaryl group can be linear or branched, cyclic or acyclic, and saturated or unsaturated, and wherein hetero atoms, such as oxygen, nitrogen, sulfur, silicon, phosphorus, boron, and the like either may or may not be present in either the aryl or the alkyl portion of the alkylaryl group) in one embodiment with at least about 6 carbon atoms, and in another embodiment with at least about 7 carbon atoms, and in one embodiment with no more than about 100 carbon atoms, in another embodiment with no more than about 50 carbon atoms, and in yet another embodiment with no more than about 18 carbon atoms, although the number of carbon atoms can be outside of these ranges, such as tolyl or the like, wherein the substituents on the substituted and unsubstituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring. The reaction occurs by admixing the acid-substituted colorant with an alcohol of the formula $R_5$—OH, an optional solvent, and an optional esterification catalyst and heating.

The acid-substituted colorant and the alcohol are present in any desired or effective relative amounts, in one embodiment at least about 1 mole of alcohol per every one mole of acid group, in another embodiment at least about 1.05 moles of alcohol per every one mole of acid group, and in yet another embodiment at least about 1.1 moles of alcohol per every one mole of acid group, and in one embodiment no more than about 2 moles of alcohol per every one mole of acid group, in another embodiment no more than about 1.5 moles of alcohol per every one mole of acid group, and in yet another embodiment no more than about 1.25 moles of alcohol per every one mole of acid group, although the relative amounts of acid-substituted colorant and alcohol can be outside of these ranges.

When the optional esterification catalyst is present, any desired or effective esterification catalyst can be used, such as para-toluene sulfonic acid, dibutyl tin dilaurate, or the like, as well as mixtures thereof. The esterification catalyst is present in any desired or effective amount, in one embodiment at least about 0.05 mole of esterification catalyst per every one mole of alcohol, and in one embodiment no more than about 0.5 mole of esterification catalyst per mole of alcohol, although the amount of esterification catalyst can be outside of these ranges.

When present, any desired or effective solvent can be used. Examples of suitable solvents include xylene, toluene, benzene, chlorobenzene, nitrobenzene, dichlorobenzene, and the like, as well as mixtures thereof. When the optional solvent is used, the reactants are present in the solvent in any desired or effective amount, in one embodiment at least about 25 grams of alcohol per every one liter of solvent, in another embodiment at least about 50 grams of alcohol per every one liter of solvent, and in yet another embodiment at least about 100 grams of alcohol per every one liter of solvent, and in one embodiment no more than about 200 grams of alcohol per every one liter of solvent, in another embodiment no more than about 150 grams of alcohol per every one liter of solvent, and in yet another embodiment no more than about 100 grams of alcohol per every one liter of solvent, although the amount of solvent can be outside of these ranges.

The reaction mixture containing the alcohol, the acid-substituted colorant, the optional solvent, and the optional esterification catalyst is heated to any desirable or effective temperature, typically the reflux temperature of the selected solvent, in one embodiment at least about 100° C., and in one embodiment no more than about 130° C., although the temperature can be outside of these ranges.

The reaction mixture containing the alcohol, the acid-substituted colorant, the optional solvent, and the optional esterification catalyst is heated for any desirable or effective period of time, in one embodiment at least about 2 hours, in another embodiment at least about 24 hours, and in one embodiment no more than about 72 hours, and in another embodiment no more than about 48 hours, although the heating time can be outside of these ranges.

The esterified colorant can be recovered from the reaction mixture as a solid by filtration, followed by washing and drying. If desired, purification can be carried out by filtration, redissolution in the solvent, heating, cooling, precipitating the colorant from the solution, filtering, washing the colorant with a solvent such as methanol, ethanol, or the like, and repeating this cycle until thin layer chromatography of the collected solid indicates that there is no detectable unreacted reactant present in the solid.

The carboxylate group can be further reacted to form an amide group of the formula

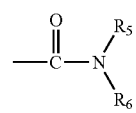

wherein $R_6$ has the same definition as $R_5$ by admixing the acid-substituted colorant with a primary or secondary amine of the formula $NHR_5R_6$, an optional solvent, and an optional amidification catalyst and heating.

The acid-substituted colorant and the amine are present in any desired or effective relative amounts, in one embodiment at least about 1 mole of amine per every one mole of acid group, in another embodiment at least about 1.05 moles of amine per every one mole of acid group, and in yet another embodiment at least about 1.1 moles of amine per every one mole of acid group, and in one embodiment no more than about 2 moles of amine per every one mole of acid group, in another embodiment no more than about 1.5 moles of amine per every one mole of acid group, and in yet another embodiment no more than about 1.25 moles of amine per every one mole of acid group, although the relative amounts of acid-substituted colorant and amine can be outside of these ranges.

When the optional amidification catalyst is present, any desired or effective amidification catalyst can be used, such as phosphoric acid or the like. The amidification catalyst is present in any desired or effective amount, in one embodiment at least about 0.05 mole of amidification catalyst per every one mole of amine, and in one embodiment no more than about 0.5 mole of amidification catalyst per mole of amine, although the amount of amidification catalyst can be outside of these ranges.

When present, any desired or effective solvent can be used. Examples of suitable solvents include xylene, toluene, benzene, chlorobenzene, nitrobenzene, dichlorobenzene, and the like, as well as mixtures thereof. When the optional solvent is used, the reactants are present in the solvent in any desired or effective amount, in one embodiment at least about 25 grams of amine per every one liter of solvent, in another embodiment at least about 50 grams of amine per every one liter of solvent, and in yet another embodiment at least about 100 grams of amine per every one liter of solvent, and in one embodiment no more than about 200 grams of amine per every one liter of solvent, in another embodiment no more than about 150 grams of amine per every one liter of solvent, and in yet another embodiment no more than about 100 grams of amine per every one liter of solvent, although the amount of solvent can be outside of these ranges.

The reaction mixture containing the amine, the acid-substituted colorant, the optional solvent, and the optional amidification catalyst is heated to any desirable or effective temperature, typically the reflux temperature of the selected solvent, in one embodiment at least about 100° C., and in one embodiment no more than about 200° C., although the temperature can be outside of these ranges.

The reaction mixture containing the amine, the acid-substituted colorant, the optional solvent, and the optional amidification catalyst is heated for any desirable or effective period of time, in one embodiment at least about 2 hours, in another embodiment at least about 24 hours, and in one embodiment no more than about 72 hours, and in another embodiment no more than about 48 hours, although the heating time can be outside of these ranges.

The amidified colorant can be recovered from the reaction mixture as a solid by filtration, followed by washing and drying. If desired, purification can be carried out by filtration, redissolution in the solvent, heating, cooling, precipitating the colorant from the solution, filtering, washing the colorant with a solvent such as methanol, ethanol, or the like, and repeating this cycle until thin layer chromatography of the collected solid indicates that there is no detectable unreacted reactant present in the solid.

The —S— sulfide bond can subsequently be oxidized to a sulfoxide bond or a sulfone bond. In many embodiments, the phthalocyanine compound having the sulfide bond exhibits a green color. Oxidation of the sulfide bond tends to shift the hue toward the blue region of the spectrum, thereby enabling fine-tuning of the hue of the colorant as desired through various shades of cyan and blue. Further fine-tuning of hue can be achieved by selection of the "M" moiety in the center of the phthalocyanine.

Oxidation can be carried out by any desired or effective method. For example, the phthalocyanine compound having the sulfide bond can be reacted with an oxidizing agent, optionally in the presence of a solvent, to convert the sulfide bond to a sulfoxide bond or a sulfone bond.

Examples of suitable oxidizing agents include hydrogen peroxide, per-acids such as m-chloroperbenzoic acid, other organic peroxides, and the like, as well as mixtures thereof.

When an optional solvent is employed, examples of suitable solvents include acetone, methylisobutylketone, methylethylketone, other fully oxidized or non-oxidizable solvents that dissolve both the dye and oxidizing agent, and the like, as well as mixtures thereof.

The oxidizing agent is present in any desired or effective amount, in one embodiment at least about 1 mole of oxidizing agent per every one mole of sulfide substituent on the phthalocyanine, in another embodiment at least about 2 moles of oxidizing agent per every one mole of sulfide substituent on the phthalocyanine, and in yet another embodiment at least about 3 moles of oxidizing agent per every one mole of sulfide substituent on the phthalocyanine, and in one embodiment no more than about 50 moles of oxidizing agent per every one mole of sulfide substituent on the phthalocyanine, in another embodiment no more than about 25 moles of oxidizing agent per every one mole of sulfide substituent on the phthalocyanine, and in yet another embodiment no more than about 10 moles of oxidizing agent per every one mole of sulfide substituent on the phthalocyanine, although the relative amounts can be outside of these ranges. Further information on oxidation of sulfides is disclosed in, for example, "Chemistry of Oxaziridines. 10. Selective Catalytic Oxidation of Sulfides to Sulfoxides Using N-Sulfonyloxaziridines," Franklin A. Davis and Sankar G. Lal, *J. Org. Chem.*, 1988, 53, 5004-5007, the disclosure of which is totally incorporated herein by reference.

When present, the optional solvent is present in any desired or effective amount, in one embodiment at least about 1 milliliters of solvent per every gram of reaction solids, in another embodiment at least about 5 milliliters of solvent per every gram of reaction solids, and in yet another embodiment at least about 10 milliliters of solvent per every gram of reaction solids, and in one embodiment no more than about 1,000 milliliters of solvent per every gram of reaction solids, in another embodiment no more than about 100 milliliters of solvent per every gram of reaction solids, and in yet another embodiment no more than about 50 milliliters of solvent per every gram of reaction solids, although the relative amounts can be outside of these ranges.

The reaction between the oxidizing agent and the sulfide-substituted phthalocyanine can take place at any desired or effective temperature, in one embodiment at least about −180° C., in another embodiment at least about −78° C., and in yet another embodiment at least about −35° C., and in one embodiment no more than about 200° C., in another embodiment no more than about 100° C., and in yet another embodiment no more than about 25° C., although the temperature can be outside of these ranges.

The reaction between the oxidizing agent and the sulfide-substituted phthalocyanine can take place for any desired or effective amount of time, in one embodiment at least about 1 minute, in another embodiment at least about 30 minutes, and in yet another embodiment at least about 1 hour, and in one embodiment no more than about 1 week, in another embodiment no more than about 1 day, and in yet another embodiment no more than about 14 hours, although the time period can be outside of these ranges.

Thereafter the oxidized product can be recovered by any desired method, such as preparative thin layer chromatography, column chromatography, recrystallization, distillation, or the like.

Alternatively, the alkylaryl sulfide phthalonitrile adduct can be oxidized prior to converting it to the phthalocyanine. This reaction is carried out by the same method described above for oxidation of the phthalocyanine, with similar oxidizing agents, solvents, molar ratios, reaction times and temperatures, and the like. The conversion of the oxidized alkylaryl sulfide phthalonitrile adduct to the phthalocyanine is then carried out by the same method described above for conversion of the sulfide-substituted intermediate to the phthalocyanine, with similar reactants, molar ratios, reaction times and temperatures, and the like.

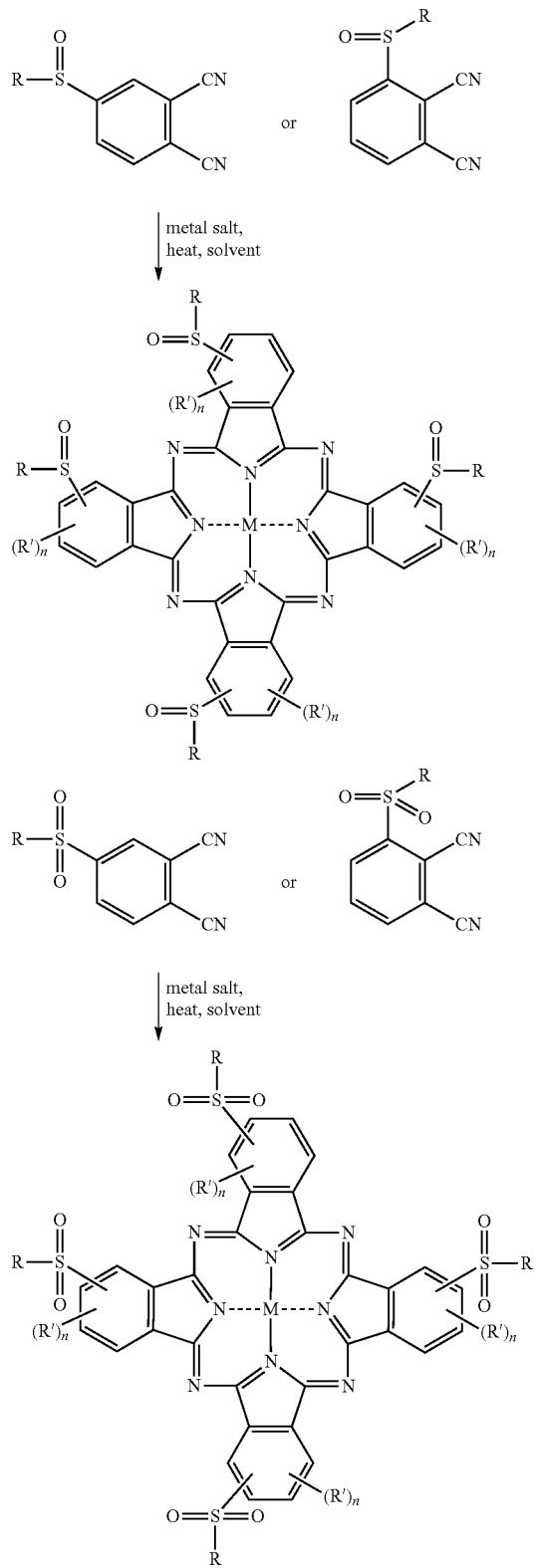

In embodiments wherein it is desired to have the phthalocyanine substituted with a combination of sulfide-R groups, sulfoxide-R groups, and/or sulfone-R groups, a combination of intermediate compounds of the formulae

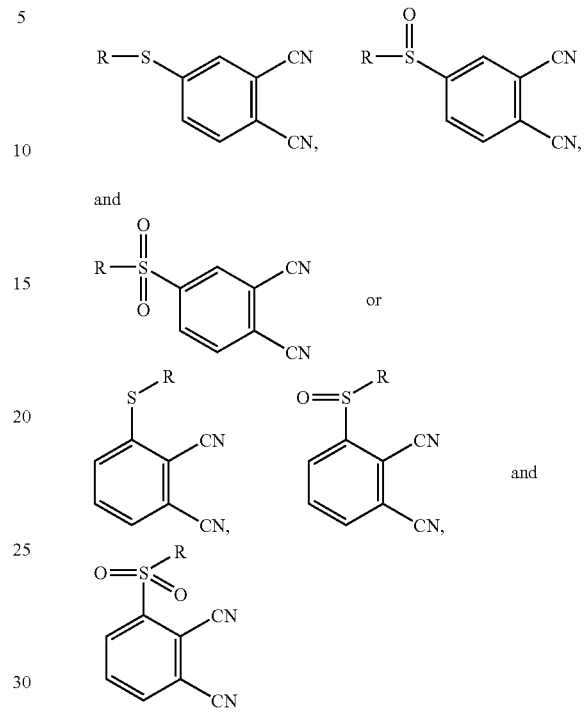

can be employed. One can thus fine-tune the hue of the resulting phthalocyanine colorant between green, cyan, and blue.

Phase change inks as disclosed herein contain a phase change carrier system or composition. The phase change carrier composition is typically designed for use in either a direct printing mode or an indirect or offset printing transfer system.

In the direct printing mode, the phase change carrier composition in one embodiment contains one or more materials that enable the phase change ink (1) to be applied in a thin film of uniform thickness on the final recording substrate (such as paper, transparency material, and the like) when cooled to ambient temperature after printing directly to the recording substrate, (2) to be ductile while retaining sufficient flexibility so that the applied image on the substrate will not fracture upon bending, and (3) to possess a high degree of lightness, chroma, transparency, and thermal stability.

In an offset printing transfer or indirect printing mode, the phase change carrier composition in one embodiment exhibits not only the characteristics desirable for direct printing mode inks, but also certain fluidic and mechanical properties desirable for use in such a system, as described in, for example, U.S. Pat. No. 5,389,958 the disclosure of which is totally incorporated herein by reference.

Any desired or effective carrier composition can be used. Examples of suitable ink carrier materials include fatty amides, such as monoamides, triamides, tetra-amides, mixtures thereof, and the like. Specific examples of suitable fatty amide ink carrier materials include stearyl stearamide, a dimer acid based tetra-amide that is the reaction product of dimer acid, ethylene diamine, and stearic acid, a dimer acid based tetra-amide that is the reaction product of dimer acid, ethylene diamine, and a carboxylic acid having at least about 36 carbon atoms, and the like, as well as mixtures thereof. When the fatty amide ink carrier is a dimer acid based tetra-amide that is the reaction product of dimer acid, ethylene diamine, and a carboxylic acid having at least about 36 carbon atoms, the carboxylic acid is of the general formula

wherein R is an alkyl group, including linear, branched, saturated, unsaturated, and cyclic alkyl groups, said alkyl group in one embodiment having at least about 36 carbon atoms, in another embodiment having at least about 40 carbon atoms, said alkyl group in one embodiment having no more than about 200 carbon atoms, in another embodiment having no more than about 150 carbon atoms, and in yet another embodiment having no more than about 100 carbon atoms, although the number of carbon atoms can be outside of these ranges. Carboxylic acids of this formula are commercially available from, for example, Baker Petrolite, Tulsa, Okla., and can also be prepared as described in Example 1 of U.S. Pat. No. 6,174,937, the disclosure of which is totally incorporated herein by reference. Further information on fatty amide carrier materials is disclosed in, for example, U.S. Pat. No. 4,889,560, U.S. Pat. No. 4,889,761, U.S. Pat. No. 5,194,638, U.S. Pat. No. 4,830,671, U.S. Pat. No. 6,174,937, U.S. Pat. No. 5,372,852, U.S. Pat. No. 5,597,856, U.S. Pat. No. 6,174,937, and British Patent GB 2 238 792, the disclosures of each of which are totally incorporated herein by reference. Also suitable are branched triamides as disclosed in U.S. Pat. No. 6,860,930, the disclosure of which is totally incorporated herein by reference.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. No. 5,750,604, U.S. Pat. No. 5,780,528, U.S. Pat. No. 5,782,966, U.S. Pat. No. 5,783,658, U.S. Pat. No. 5,827,918, U.S. Pat. No. 5,830,942, U.S. Pat. No. 5,919,839, U.S. Pat. No. 6,255,432, U.S. Pat. No. 6,309,453, British Patent GB 2 294 939, British Patent GB 2 305 928, British Patent GB 2 305 670, British Patent GB 2 290 793, PCT Publication WO 94/14902, PCT Publication WO 97/12003, PCT Publication WO 97/13816, PCT Publication WO 96/14364, PCT Publication WO 97/33943, and PCT Publication WO 95/04760, the disclosures of each of which are totally incorporated herein by reference.

Mixtures of fatty amide materials and isocyanate-derived materials can also be employed as the ink carrier composition.

Additional suitable phase change ink carrier materials include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

Specific examples of suitable waxes include polyethylene waxes such as PE 500 and PE 655, available from Baker Petrolite, Tulsa, Okla., Fischer-Tropsch waxes, available from Sasol Wax Americas, Inc., Shelton, Conn., waxes as disclosed in, for example, Copending application Ser. No. 11/126,745 and U.S. Patent Publication 2005/0130054, the disclosures of which are totally incorporated herein by reference, and waxes as disclosed in Copending application Ser. Nos. 11/290,221, 11/291,055, 11/290,263, 11/290,222, and 11/290,265, filed Nov. 30, 2005, the disclosures of each of which are totally incorporated herein by reference.

In one specific embodiment, the phase change ink carrier comprises (a) a polyethylene wax, present in the ink in an amount in one embodiment of at least about 25 percent by weight of the ink, in another embodiment of at least about 30 percent by weight of the ink, and in yet another embodiment of at least about 37 percent by weight of the ink, and in one embodiment of no more than about 80 percent by weight of the ink, in another embodiment of no more than about 70 percent by weight of the ink, and in yet another embodiment of no more than about 60 percent by weight of the ink, although the amount can be outside of these ranges; (b) a stearyl stearamide wax, present in the ink in an amount in one embodiment of at least about 3 percent by weight of the ink, in another embodiment of at least about 5 percent by weight of the ink, and in yet another embodiment of at least about 8 percent by weight of the ink, and in one embodiment of no more than about 32 percent by weight of the ink, in another embodiment of no more than about 28 percent by weight of the ink, and in yet another embodiment of no more than about 25 percent by weight of the ink, although the amount can be outside of these ranges; (c) a dimer acid based tetra-amide that is the reaction product of dimer acid, ethylene diamine, and a long chain hydrocarbon having greater than thirty six carbon atoms and having a terminal carboxylic acid group, present in the ink in an amount in one embodiment of at least about 5 percent by weight of the ink, in another embodiment of at least about 8 percent by weight of the ink, and in yet another embodiment of at least about 10 percent by weight of the ink, and in one embodiment of no more than about 32 percent by weight of the ink, in another embodiment of no more than about 27 percent by weight of the ink, and in yet another embodiment of no more than about 22 percent by weight of the ink, although the amount can be outside of these ranges; (d) a urethane resin derived from the reaction of two equivalents of hydroabietyl alcohol and one equivalent of isophorone diisocyanate, present in the ink in an amount in one embodiment of at least about 6 percent by weight of the ink, in another embodiment of at least about 8 percent by weight of the ink, and in yet another embodiment of at least about 10 percent by weight of the ink, and in one embodiment of no more than about 16 percent by weight of the ink, in another embodiment of no more than about 14 percent by weight of the ink, and in yet another embodiment of no more than about 12 percent by weight of the ink, although the amount can be outside of these ranges; (e) a urethane resin that is the adduct of three equivalents of stearyl isocyanate and a glycerol-based propoxylate alcohol, present in the ink in an amount in one embodiment of at least about 2 percent by weight of the ink, in another embodiment of at least about 3 percent by weight of the ink, and in yet another embodiment of at least about 4.5 percent by weight of the ink, and in one embodiment of no more than about 13 percent by weight of the ink, in another embodiment of no more than about 10 percent by weight of the ink, and in yet another embodiment of no more than about 7.5 percent by weight of the ink, although the amount can be outside of these ranges; and (f) an antioxidant, present in the ink in an amount in one embodiment of at least about 0.01 percent by weight of the ink, in another embodiment of at least about 0.05 percent by weight of the ink, and in yet another embodiment of at least about 0.1 percent by weight of the ink, and in one embodiment of no more than about 1 percent by weight of the ink, in another embodiment of no more than about 0.5 percent by weight of the ink, and in yet another embodiment of no more than about 0.3 percent by weight of the ink, although the amount can be outside of these ranges.

In another specific embodiment, the phase change ink carrier comprises (a) a polyethylene wax, (b) a stearyl stearamide wax, (c) a branched triamide of the formula

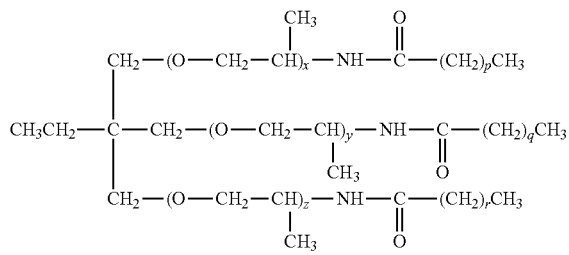

wherein x, y, and z each independently represent the number of propyleneoxy repeat units and x+y+z is from about 5 to about 6, and wherein p, q, and r each, independently of the others, are integers representing the number of repeat —($CH_2$)— units, wherein p, q, and r have an average value of from about 35, (d) a urethane resin that is the adduct of three equivalents of stearyl isocyanate and a glycerol-based alcohol, and (e) a triglyceride of hydrogenated abietic acid.

The ink carrier is present in the phase change ink in any desired or effective amount, in one embodiment of at least about 0.1 percent by weight of the ink, in another embodiment of at least about 50 percent by weight of the ink, and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink, although the amount can be outside of these ranges.

The phase change inks contain a colorant compound of the formula

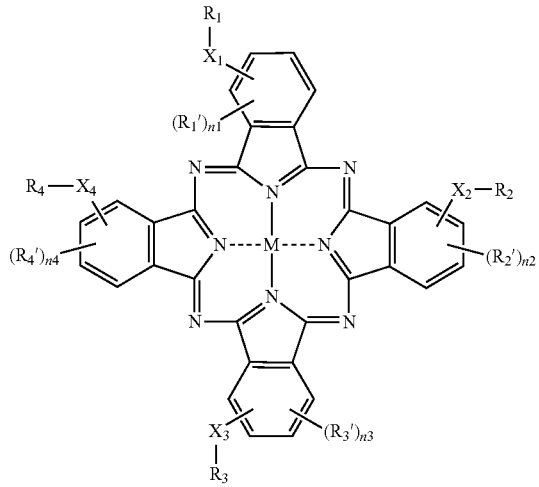

wherein $X_1$, $X_2$, $X_3$, and $X_4$ each, independently of the others, are

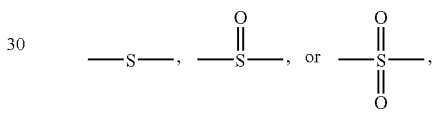

$R_1$, $R_2$, $R_3$, and $R_4$ each, independently of the others, are alkyl groups, aryl groups, arylalkyl groups, or alkylaryl groups, $R_1'$, $R_2'$, $R_3'$, and $R_4'$ each, independently of the others, are substituents, $n_1$, $n_2$, $n_3$, and $n_4$ each, independently of the others, are 0, 1, 2, or 3, and M is an atom or group of atoms capable of bonding to the central cavity of a phthalocyanine molecule, wherein axial ligands optionally can be attached to M. This colorant is present in the ink in any desired or effective amount to obtain the desired color or hue, in one embodiment of at least about 0.1 percent by weight of the ink, in another embodiment of at least about 1 percent by weight of the ink, in yet another embodiment of at least about 2 percent by weight of the ink, in still another embodiment of at least about 3 percent by weight of the ink, and in another embodiment of at least about 5 percent by weight of the ink, and in one embodiment of no more than about 20 percent by weight of the ink, in another embodiment of no more than about 13 percent by weight of the ink, and in yet another embodiment of no more than about 8 percent by weight of the ink, although the amount can be outside of these ranges. The colorant as disclosed herein can either be the sole colorant in the ink or can be present in combination with other colorants.

The inks can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 524, NAUGUARD® 76, and NAUGUARD® 512 (commercially available from Uniroyal Chemical Company, Oxford, Conn.), IRGANOX® 1010

(commercially available from Ciba Geigy), and the like. When present, the optional antioxidant is present in the ink in any desired or effective amount, in one embodiment of at least about 0.01 percent by weight of the ink, in another embodiment of at least about 0.1 percent by weight of the ink, and in yet another embodiment of at least about 1 percent by weight of the ink, and in one embodiment of no more than about 20 percent by weight of the ink, in another embodiment of no more than about 5 percent by weight of the ink, and in yet another embodiment of no more than about 3 percent by weight of the ink, although the amount can be outside of these ranges.

Other optional additives to the inks include clarifiers, such as UNION CAMP® X37-523-235 (commercially available from Union Camp), in an amount in one embodiment of at least about 0.01 percent by weight of the ink, in another embodiment of at least about 0.1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 and KE-100 Resins, triglycerides of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like, in an amount in one embodiment of at least about 0.1 percent by weight of the ink, in another embodiment of at least about 5 percent by weight of the ink, and in yet another embodiment of at least about 10 percent by weight of the ink, and in one embodiment of no more than about 98 percent by weight of the ink, in another embodiment of no more than about 75 percent by weight of the ink, and in yet another embodiment of no more than about 50 percent by weight of the ink, although the amount can be outside of these ranges, adhesives, such as VERSAMID® 757, 759, or 744 (commercially available from Henkel), in an amount in one embodiment of at least about 0.1 percent by weight of the ink, in another embodiment of at least about 1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount in one embodiment of at least about 0.1 percent by weight of the ink, in another embodiment of at least about 1 percent by weight of the ink, and in yet another embodiment of at least about 2 percent by weight of the ink, and in one embodiment of no more than about 50 percent by weight of the ink, in another embodiment of no more than about 30 percent by weight of the ink, and in yet another embodiment of no more than about 10 percent by weight of the ink, although the amount can be outside of these ranges, and the like.

The ink compositions in one embodiment have melting points of no lower than about 50° C., in another embodiment of no lower than about 70° C., and in yet another embodiment of no lower than about 80° C., and have melting points in one embodiment of no higher than about 160° C., in another embodiment of no higher than about 140° C., and in yet another embodiment of no higher than about 100° C., although the melting point can be outside of these ranges.

The ink compositions generally have melt viscosities at the jetting temperature (in one embodiment no lower than about 75° C., in another embodiment no lower than about 100° C., and in yet another embodiment no lower than about 120° C., and in one embodiment no higher than about 180° C., and in another embodiment no higher than about 150° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, although the melt viscosity can be outside of these ranges. In another specific embodiment, the inks have viscosities of from about 7 to about 15 centipoise at temperatures of about 110, 115, and/or 120° C.

The ink compositions can be prepared by any desired or suitable method. For example, the ink ingredients can be mixed together, followed by heating, to a temperature in one embodiment of at least about 100° C., and in one embodiment of no more than about 140° C., although the temperature can be outside of these ranges, and stirring until a homogeneous ink composition is obtained, followed by cooling the ink to ambient temperature (typically from about 20 to about 25° C.). The inks are solid at ambient temperature. In a specific embodiment, during the formation process, the inks in their molten state are poured into molds and then allowed to cool and solidify to form ink sticks.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like.

Specific embodiments will now be described in detail. These examples are intended to be illustrative, and the claims are not limited to the materials, conditions, or process parameters set forth in these embodiments. All parts and percentages are by weight unless otherwise indicated.

Example I 4-($C_{18}$ Sulfide)Phthalonitrile Intermediate

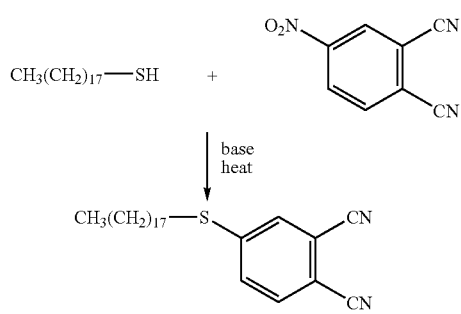

To a 500 milliliter one-necked round bottom flask equipped with magnetic stirrer was charged 45.84 grams of pre-melted 1-octadecanethiol (MW=286.5; obtained from Aldrich Chemical Co., Milwaukee, Wis.), 20.0 grams of potassium carbonate (MW=138), and 200 grams of dry (w/molecular sieves) N-methyl pyrrolidinone (NMP). The flask was placed in a 90° C. oil bath. After two hours of heating and stirring, about 25 grams of 4-nitrophthalonitrile (MW=173; obtained from TCI America, Portland, Oreg.) was added. The reaction mixture turned yellow orange immediately. After about 15 additional minutes, the reaction mixture turned greenish. Yellow gas was observed evolving from the reaction for about 1 hour. After about 3 hours of heating and stirring, the brownish contents were poured into 300 milliliters of water. Yellow solids precipitated out, were filtered, rinsed with water, and dried. The collected solids were slurried with methanol and filtered. Yield after drying was 56.3 grams.

Example II 4-($C_{12}$ Sulfide)Phthalonitrile Intermediate

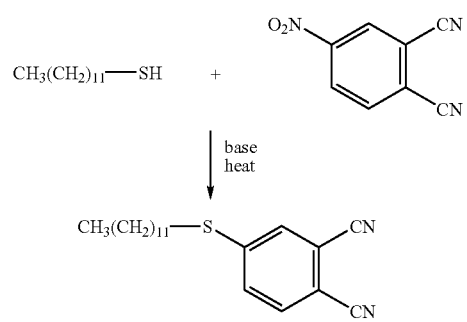

To a 500 milliliter one-necked round bottom flask equipped with magnetic stirrer was charged 32.1 grams of n-dodecylmercaptan (MW=202; obtained from Chevron Phillips Specialty Chemicals), 20.0 grams of potassium carbonate (MW=138), and 200 grams of dry NMP. The flask was placed in a 90° C. oil bath with stirring. After two hours, 25.0 grams of 4-nitrophthalonitrile (MW=173) was added. The reaction mixture subsequently turned greenish and bubbling was observed. After 3 hours, the reaction mixture turned brown and was poured into a 500 milliliter beaker containing 300 milliliters of deionized water. Solids precipitated out and were filtered. The collected solids were slurried with methanol, filtered, and dried. Yield after drying was 36 grams.

Example III 3-($C_{18}$ Sulfide)Phthalonitrile Intermediate

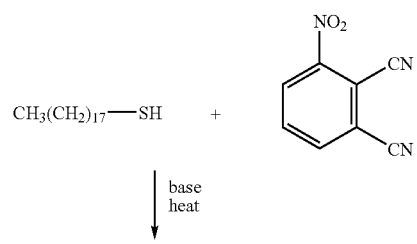

-continued

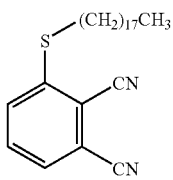

The process of Example I is repeated except that 3-nitrophthalonitrile is substituted for 4-nitrophthalonitrile.

Example IV 3-($C_{12}$ Sulfide) Phthalonitrile Intermediate

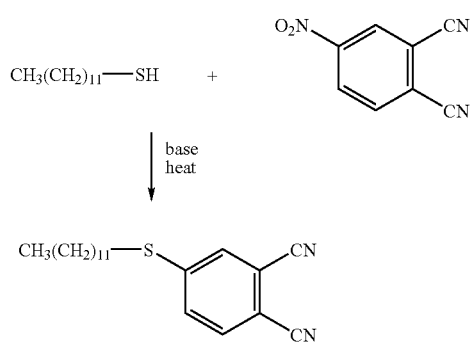

The process of Example II is repeated except that 3-nitrophthalonitrile is substituted for 4-nitrophthalonitrile.

Example V

Carboxylic Acid Containing Aromatic Sulfide Intermediate

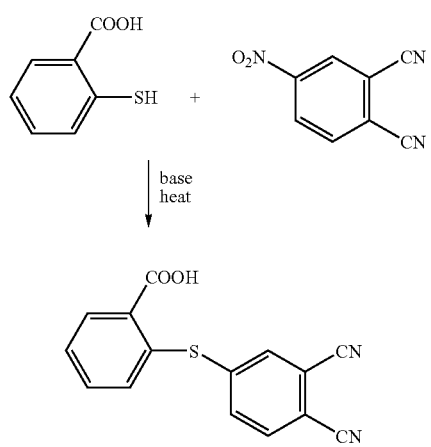

In a 500 milliliter one-necked round bottom flask equipped with a magnetic stirrer was charged 20.0 grams of thiosalicylic acid (MW=154, obtained from Aldrich Chemical Co.), 17.9 grams of potassium carbonate (MW=138) and 200 grams of NMP. The flask was placed in a 120° C. oil bath for two hours. Bubbling was observed. After several minutes, about 22.5 grams of 4-nitrophthalonitrile (MW=173) were added. Brown vapors were observed evolving from the reaction for about 1 hour. After about 3 hours of heating and stirring, the brownish contents were poured into 300 milliliters of water. The pH of the contents was adjusted with concentrated HCl from 12 to 5. As the pH was lowered, solids precipitated out. They were filtered, collected, and dried. Yield was 29.3 grams.

Example VI 4-($C_{18}$ Sulfide)Copper Phthalocyanine Colorant

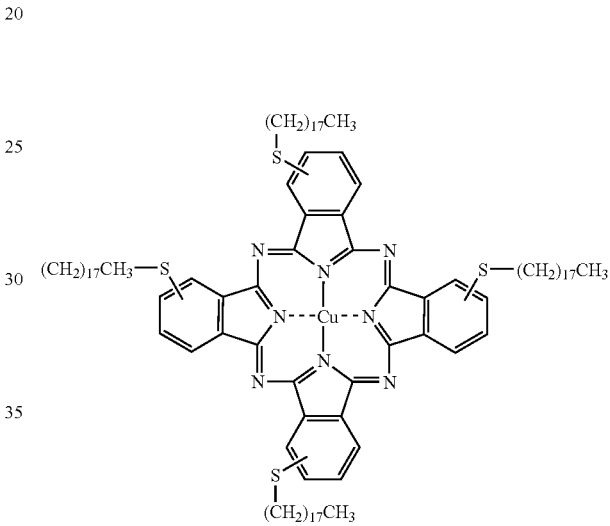

To a 250 milliliter one-necked round bottom flask equipped with a TEFLON® coated magnetic stirrer and a condenser was charged 25.0 grams of the intermediate compound prepared in Example I (4-octadecylthiophthalonitrile; MW=412), 2.75 grams of copper II acetate (MW=181), 9.8 grams of ammonia acetate (MW=77), and 150 grams of dry NMP (in molecular sieve). The round bottom flask was placed in a 130° C. oil bath. The contents turned dull greenish yellow after about one hour. The temperature of the oil bath was controlled at 130° C. for about 3 hours and subsequently increased in heat to about 180° C. and held at that temperature for 1 hour. The color of the contents at that time were blue green. The contents were then poured into 500 milliliters of deionized water. Green solids precipitated out. The solids were filtered and slurried with methanol and filtered again. The spectral strength of the green colorant was determined using a spectrophotometric procedure based on the measurement of the colorant in solution by dissolving the colorant in toluene and measuring the absorbance using a Perkin Elmer Lambda 2S UV/VIS spectrophotometer. The spectral strength of the colorant measured as about 52,189 mL*Absorbance Units per gram at absorption $\lambda_{max}$ of 694 nms.

Example VII

4-($C_{12}$ Sulfide)Copper Phthalocyanine Colorant

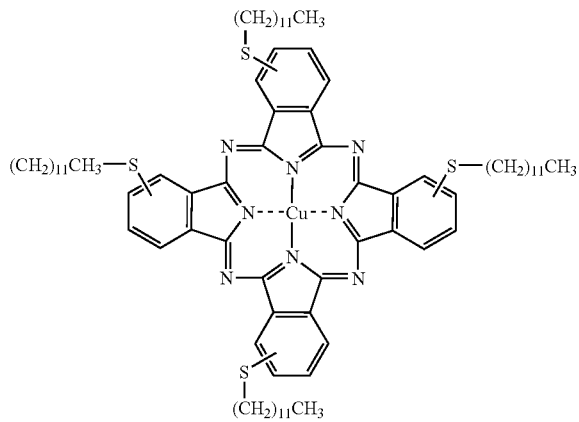

To a 100 milliliter one-necked round bottle equipped with a magnetic stirrer and a condenser was charged 15.0 grams of the intermediate compound prepared in Example II (4-dodecylthiophthalonitrile; (MW=328), 7.4 grams of ammonia acetate (MW=77), 2.4 grams of copper acetate (MW=18), and 60 grams of dry NMP. The round bottle was placed in a 130° C. oil bath. After half an hour the contents turned green and very thick. About 30 grams of additional dry NMP were added. The temperature of the oil bath was then raised to about 160° C., and upon reaching that temperature 30 grams of additional dry NMP were added because the contents became thick again. After being stirred at 160° C. for three hours, the reaction mixture was poured into 600 grams of deionized water. Solid were filtered and dried. After drying, the yield was 5.3 grams. The spectral strength of the green colorant was determined using a spectrophotometric procedure based on the measurement of the colorant in solution by dissolving the colorant in toluene and measuring the absorbance using a Perkin Elmer Lambda 2S UV/VIS spectrophotometer. The spectral strength of the colorant measured as about 10,620 mL*Absorbance Units per gram at absorption $\lambda_{max}$ of 694 nms in toluene.

Example VIII

3-($C_{18}$ Sulfide)Copper Phthalocyanine Colorant

The process of Example VI is repeated except that the intermediate compound prepared in Example III is used instead of the intermediate compound prepared in Example I.

Example IX

3-($C_{12}$ Sulfide)Copper Phthalocyanine Colorant

The process of Example VII is repeated except that the intermediate compound prepared in Example IV is used instead of the intermediate compound prepared in Example II.

Example X

Carboxylic Acid Containing Aromatic Sulfide Phthalocyanine Dye

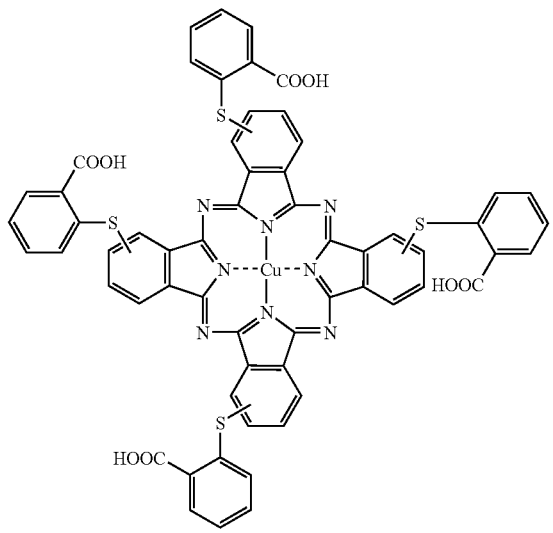

To a 100 milliliter one-necked round bottle equipped with a magnetic stirrer and a condenser was charged 15.0 grams of the phthalonitrile thiosalicylic acid intermediate prepared in Example V (MW=280), 2.4 grams of copper acetate (MW=181), and 90 grams of dry NMP (in molecular sieve). The round bottle was placed in a 130° C. oil bath. The contents turned green after half an hour. Thereafter, the temperature of the oil bath was controlled at 180° C. for about 5 hours. The contents were then poured into 200 milliliters of water. The collected green solids were slurried with methanol and filtered. After dried yield was 11.2 grams. The product had a $\lambda_{max}$ of 689 nms in NMP.

Example XI

4-($C_{18}$ Sulfone)Copper Phthalocyanine Colorant

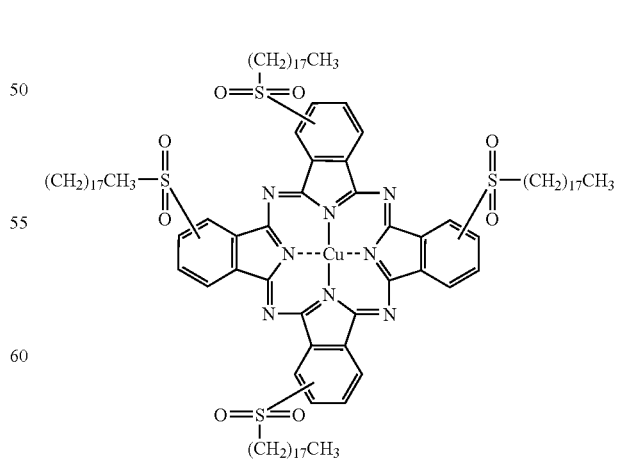

To a 125 milliliter one-necked round bottom flask equipped with a TEFLON® coated magnetic stirrer and a condenser was charged 5 grams of the green colorant prepared in Example VI), 27.5 grams of methyl isobutyl ketone (MIBK), and 25.3 grams of glacial acetic acid. The flask was placed in a 120° C. oil bath and allowed to stir and reflux. After about 1 hour, 25 milliliters of 35 percent hydrogen peroxide was slowly added through the condenser over 20 minutes and refluxing was continued. After about 1 additional hour, the heat was turned off and the reaction mixture was allowed to stir at room temperature for about an hour. At this time, 20 milliliters of hydrogen peroxide was added to the already blue solid and the reaction vessel and its contents were allowed to stir at room temperature for 4 days. The contents of the reaction flask were then poured into a 1 liter beaker containing 300 milliliters of methanol, stirred, and filtered to collect the blue solid. This methanol washing procedure was repeated one more time. The spectral strength of the blue-cyan colorant was determined using a spectrophotometric procedure based on the measurement of the colorant in solution by dissolving the colorant in toluene and measuring the absorbance using a Perkin Elmer Lambda 2S UV/VIS spectrophotometer. The spectral strength of the colorant measured as about 31,709 mL*Absorbance Units per gram at absorption $\lambda_{max}$ of 678 nms.

Example XII 4-($C_{12}$ Sulfone)Copper Phthalocyanine Colorant

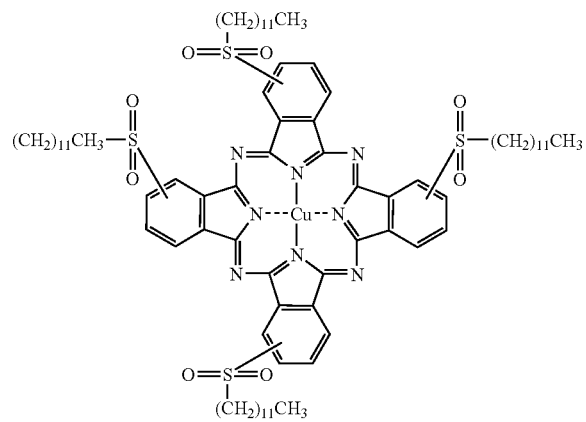

To a 250 milliliter one-necked round bottom flask equipped with a TEFLON® coated magnetic stirrer and an addition funnel was charged 5.0 grams of the green colorant prepared in Example VII), 10.0 milliliters of trifluoroacetic acid, 250 milliliters of MIBK, and 30 milliliters of 35 percent hydrogen peroxide. The reaction mixture was placed in a 120° C. oil bath and allowed to stir and reflux for 12 hours. Additional hydrogen peroxide (30 milliliters) and 20 milliliters of glacial acetic acid were then added and reflux was continued. The solids began turning blue at this point. After 7 hours of reflux, additional hydrogen peroxide (20 milliliters) was added and reflux continued. After 12 hours of reflux, additional hydrogen peroxide (20 milliliters) was added and reflux continued for 1 hour. The reaction flask was then allowed to come to room temperature and the contents of the reaction flask were poured into a 1 liter beaker containing 600 milliliters of acetone, stirred, and filtered to collect the blue solid. The blue product had a $\lambda_{max}$ of 678 nms in toluene.

Example XIII 3-($C_{18}$ Sulfone)Copper Phthalocyanine Colorant

The process of Example XI is repeated except that the green colorant prepared in Example VIII was used instead of the green colorant prepared in Example VI.

Example XIV 3-($C_{18}$ Sulfone)Copper Phthalocyanine Colorant

The process of Example XII is repeated except that the green colorant prepared in Example IX was used instead of the green colorant prepared in Example VII.

Example XV 4-($C_{18}$ Sulfone)Phthalonitrile Intermediate

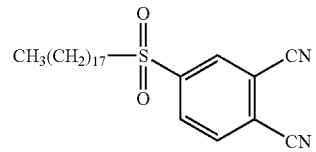

To a 250 milliliter one-necked round bottom flask equipped with a TEFLON® coated magnetic stirrer and an addition funnel is charged 5.0 grams of the intermediate prepared in Example I, 10.0 milliliters of trifluoroacetic acid, 250 milliliters of MIBK, and 30 milliliters of 35 percent hydrogen peroxide. The reaction mixture is placed in a 120° C. oil bath and allowed to stir and reflux for 12 hours. Additional hydrogen peroxide (30 milliliters) and 20 milliliters of glacial acetic acid is then added and reflux is continued. After 7 hours of reflux, additional hydrogen peroxide (20 milliliters) is added and reflux continued. After 12 hours of reflux, additional hydrogen peroxide (20 milliliters) is added and reflux continued for 1 hour. The reaction flask is then allowed to come to room temperature and the contents of the reaction flask are poured into a 1 liter beaker containing 600 milliliters of acetone, stirred, and filtered to collect the solid product.

Example XVI 4-($C_{18}$ Sulfone/Sulfide)Copper Phthalocyanine Colorant

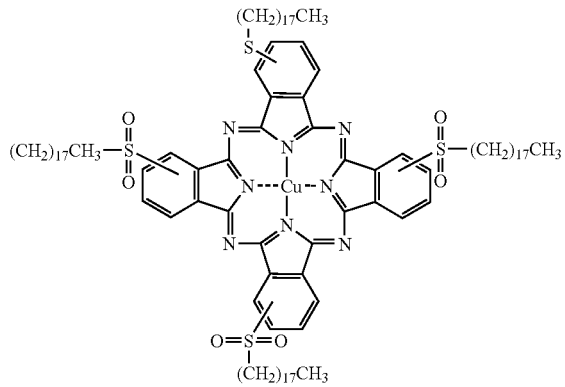

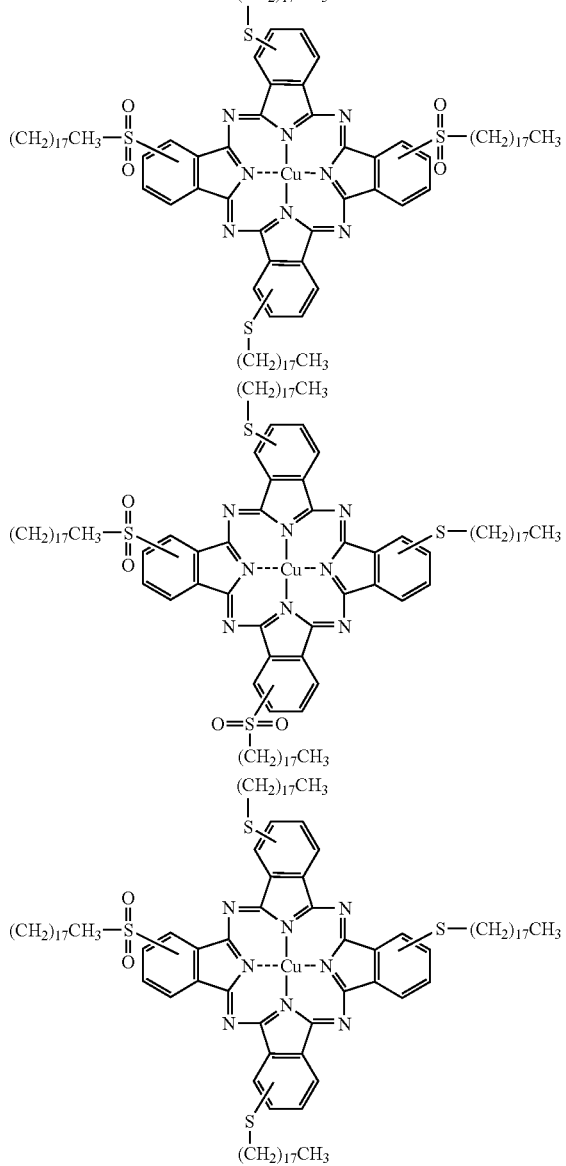

To a 250 milliliter one-necked round bottom flask equipped with a TEFLON® coated magnetic stirrer and a condenser is charged 12.5 grams of the intermediate compound prepared in Example I (4-octadecylthiophthalonitrile; MW=412), 13.5 grams of the intermediate compound prepared in Example XV (4-octadecylsulfonephthalonitrile; MW=444), 2.75 grams of copper acetate (MW=181), 9.8 grams of ammonia acetate (MW=77), and 150 grams of dry NMP (in molecular sieve). The round bottom flask is placed in a 130° C. oil bath. The temperature of the oil bath is controlled at 130° C. for about 3 hours and subsequently increased in heat to about 180° C. and held at that temperature for 1 hour. The contents are then poured into 500 milliliters of deionized water. The solids are filtered and slurried with methanol and filtered again. It is believed that the resulting product will be a mixture of compounds, including those of the indicated structures.

Example XVII 4-($C_{18}$ Sulfoxide)-Copper Phthalocyanine Colorant

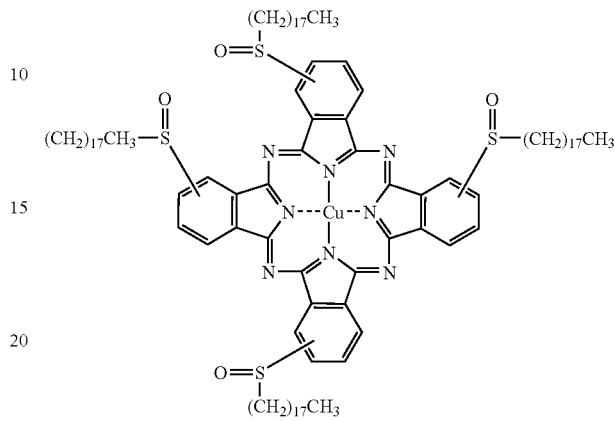

To a 200 milliliter one-necked round bottom flask equipped with a TEFLON® coated magnetic stirrer and a condenser with a gentle nitrogen blanket is charged 5 grams of the green colorant prepared as described in Example VI) and 50 milliliters of methylene chloride. The solution is cooled with stirring to −78° C. After about 1 hour, 2.1 grams of m-chloroperoxybenzoic acid in 50 milliliters of methylene chloride is slowly added over a 1 hour period of time to the reaction vessel, maintaining the −78° C. After about 1 additional hour of stirring at this temperature, the reaction mixture is allowed to warm to room temperature. A 50 gram portion of a saturated solution of sodium sulfite solution is then added. The resulting product is subsequently added to a separatory funnel and extracted with three 50 milliliter portions of methylene chloride. The methylene chloride layers are collected and distilled, yielding the product.

Example XVIII 3-($C_{18}$ Sulfide) Iron Phthalocyanine Colorant

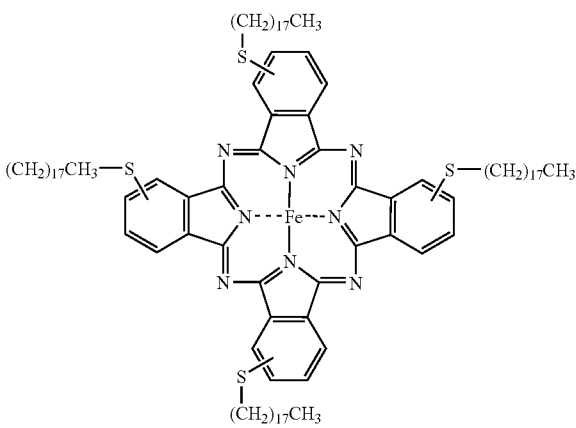

The process of Example VIII is repeated except that 1.92 grams of iron 11 chloride (available from Aldrich Chemical Co.) is substituted for the 2.75 grams of copper 11 acetate.

Example XIX 3-($C_{18}$ Sulfide) Manganese Phthalocyanine Colorant

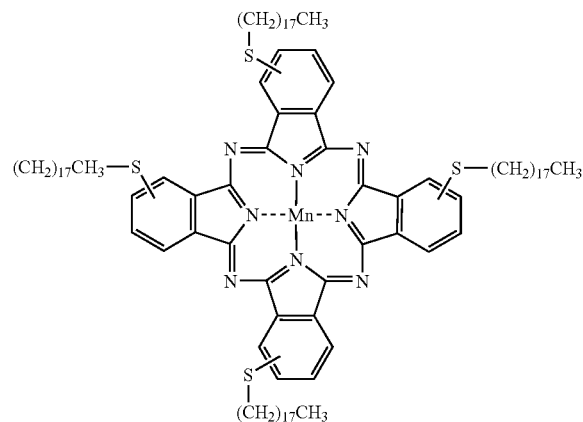

The process of Example VIII is repeated except that 1.91 grams of manganese II chloride (available from Aldrich Chemical Co.) is substituted for the 2.75 grams of copper II acetate.

Example XX

Tetra-(D-stearylester)-Substituted Aromatic Sulfide Copper Phthalocyanine

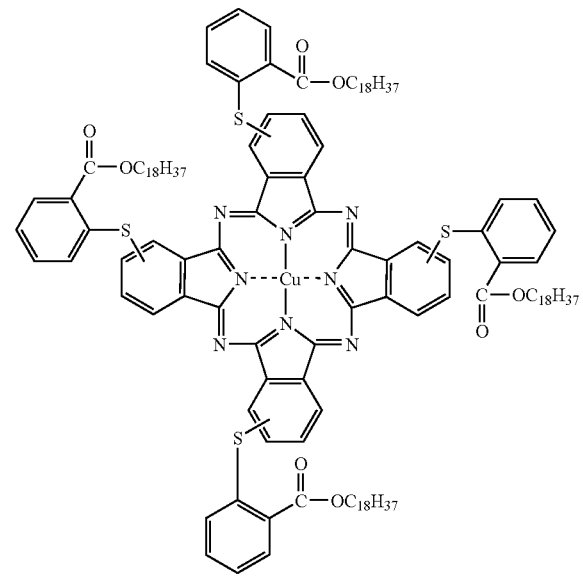

To a 200 milliliter one-necked round bottom flask equipped with magnetic stir bar, condenser, and silicone oil bath is charged 10.0 grams of tetra-(p-carboxy phenoxy) phthalocyanine prepared as described in Example X, 9.7 grams of octadecanol, a spatula tip full of p-toluene sulfonic acid, and 120 milliliters of toluene. The reaction mixture is brought to reflux. After 2 days, the reaction vessel is allowed to cool and is poured into a 1,000 milliliter beaker with 300 milliliters of methanol to precipitate the product. The product is filtered, washed with methanol several times, and collected.

Example XXI

Tetra-(p)-stearylamide)-Substituted Aromatic Sulfide Copper Phthalocyanine

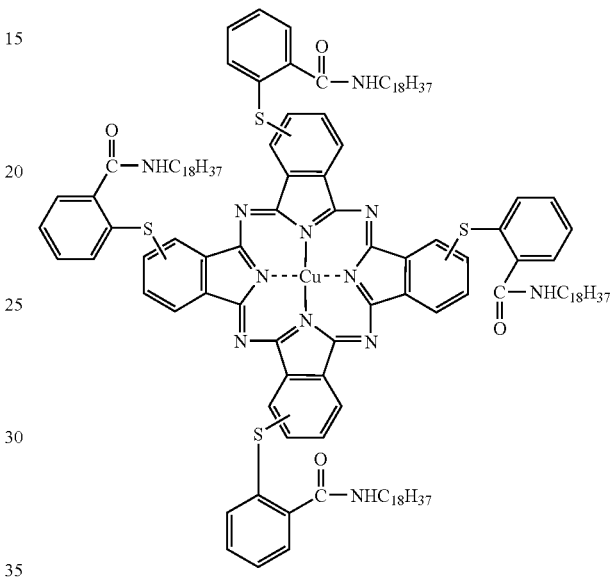

To a 200 milliliter one-necked round bottom flask equipped with magnetic stir bar, condenser, and silicone oil bath is charged 10.0 grams of tetra-(p-carboxy phenoxy) phthalocyanine prepared as described in Example X, 9.7 grams of octadecyl amine, and 120 milliliters of toluene. The reaction mixture is brought to reflux. After 2 hours, the toluene is distilled off. The reaction product is then heated to 190° C. with stirring and held at that temperature for 3 hours under a nitrogen atmosphere. The contents of the reaction vessel are then poured into an aluminum mold and allowed to cool.

Ink Example 1

An ink base was prepared by melting, admixing, and filtering the following ingredients: (a) polyethylene wax (PE 655, obtained from Baker Petrolite, Tulsa, Okla., of the formula $CH_3(CH_2)_{50}CH_3$), 43.59 parts by weight; (b) stearyl stearamide wax (KEMAMIDE® S-180, obtained from Crompton Corporation, Greenwich, Conn.), 19.08 parts by weight; (c) tetra-amide resin obtained from the reaction of one equivalent of a C-36 dimer acid (obtained from Uniqema, New Castle, Del.) with two equivalents of ethylene diamine and UNICID® 700 (obtained from Baker Petrolite, Tulsa, Okla., a long chain hydrocarbon having a terminal carboxylic acid group), prepared as described in Example 1 of U.S. Pat. No. 6,174,937, the disclosure of which is totally incorporated herein by reference, 18.94 parts by weight; (d) urethane resin obtained from the reaction of two equivalents of ABITOL® E hydroabietyl alcohol (obtained from Hercules Inc., Wilmington, Del.) and one equivalent of isophorone diisocyanate, prepared as described in Example 1 of U.S. Pat. No. 5,782, 966, the disclosure of which is totally incorporated herein by reference, 11.71 parts by weight; (e) urethane resin that is the adduct of three equivalents of stearyl isocyanate and a glycerol-based alcohol, prepared as described in Example 4 of U.S. Pat. No. 6,309,453, the disclosure of which is totally incorporated herein by reference, 6.48 parts by weight; and (f) NAUGUARD® 445 antioxidant (obtained from Uniroyal Chemical Co., Middlebury, Conn.), 0.20 parts by weight.

600 grams of the ink carrier components listed above in the percentages listed above were added to a 1 liter beaker and heated in an oven at 135° C. until molten. Subsequently, the beaker was inserted into a heating mantle set to 135° C. and the contents of the beaker were stirred for 45 minutes. The resulting ink was then filtered through a combination of Whatman #3 and 0.2 micron NAE filters and placed in a Mott filter assembly. Filtration was supported by the addition of 1 percent by weight FILTER AID, obtained from Fluka Chemika, Switzerland, and proceeded at a temperature of 135° C. until complete after 6 hours. The ink base was poured into molds containing about 31 grams of the colorless ink base and allowed to cool.

Ink Example 2

About 30.5 grams of the colorless ink base from Ink Example 1 was placed in a 100 milliliter beaker with a magnetic stir bar and subsequently placed in a 135° C. oil bath until molten. Thereafter, 1.0 gram of the colorant from Example VI was added and stirred for about 3 hours. The green colored ink was then poured into an aluminum mold.

Ink Example 3

About 30.8 grams of the colorless ink base from Ink Example 1 was placed in a 100 milliliter beaker with a magnetic stir bar and subsequently placed in a 135° C. oil bath until molten. Thereafter, 1.0 gram of the colorant from Example XI was added and stirred for about 3 hours. The blue-cyan colored ink was then poured into an aluminum mold.

Ink Example 4

Using a RK Print-Coat Instruments Ltd. K-proofer, print samples of the ink from Ink Examples 2 and 3 were produced on HAMMERMILL LASERPRINT® paper. These proofs show three different intensities of ink coverage on the paper.

Ink Example 5

Ink Examples 1, 2, and 4 are repeated with the colorants of Examples VII to X, XII to XIV, and XVI to XXI. It is believed that similar results will be obtained.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A phase change ink composition comprising a phase change ink carrier and a colorant compound of the formula

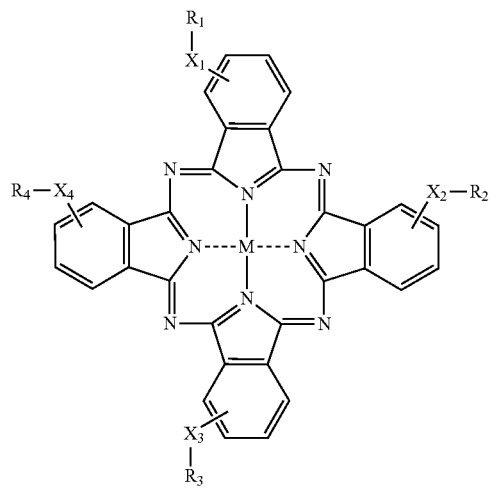

wherein $X_1$, $X_2$, $X_3$, and $X_4$ are each —S—, $R_1$, $R_2$, $R_3$, and $R_4$ each, independently of the others, are alkyl groups having at least 1 carbon atom, aryl groups having at least about 5 carbon atoms, arylalkyl groups having at least about 6 carbon atoms, or alkylaryl groups having at least about 8 carbon atoms, M is an atom or group of atoms capable of bonding to the central cavity of a phthalocyanine molecule, wherein axial ligands optionally can be attached to M.

2. An ink according to claim 1 wherein $R_1$, $R_2$, $R_3$, and $R_4$ are all the same.

3. An ink according to claim 1 wherein at least one of $R_1$, $R_2$, $R_3$, and $R_4$ is different from the others.

4. An ink according to claim 1 wherein at least two of $R_1$, $R_2$, $R_3$, and $R_4$ are different from the others.

5. An ink according to claim 1 wherein $R_1$, $R_2$, $R_3$, and $R_4$ are alkyl groups.

6. An ink according to claim 5 wherein the alkyl groups have at least about 8 carbon atoms.

7. An ink according to claim 5 wherein the alkyl groups have at least about 12 carbon atoms.

8. An ink according to claim 1 wherein M is copper.

9. An ink according to claim 1 wherein the colorant is

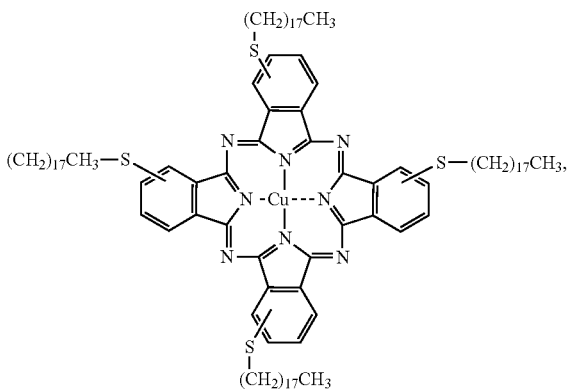

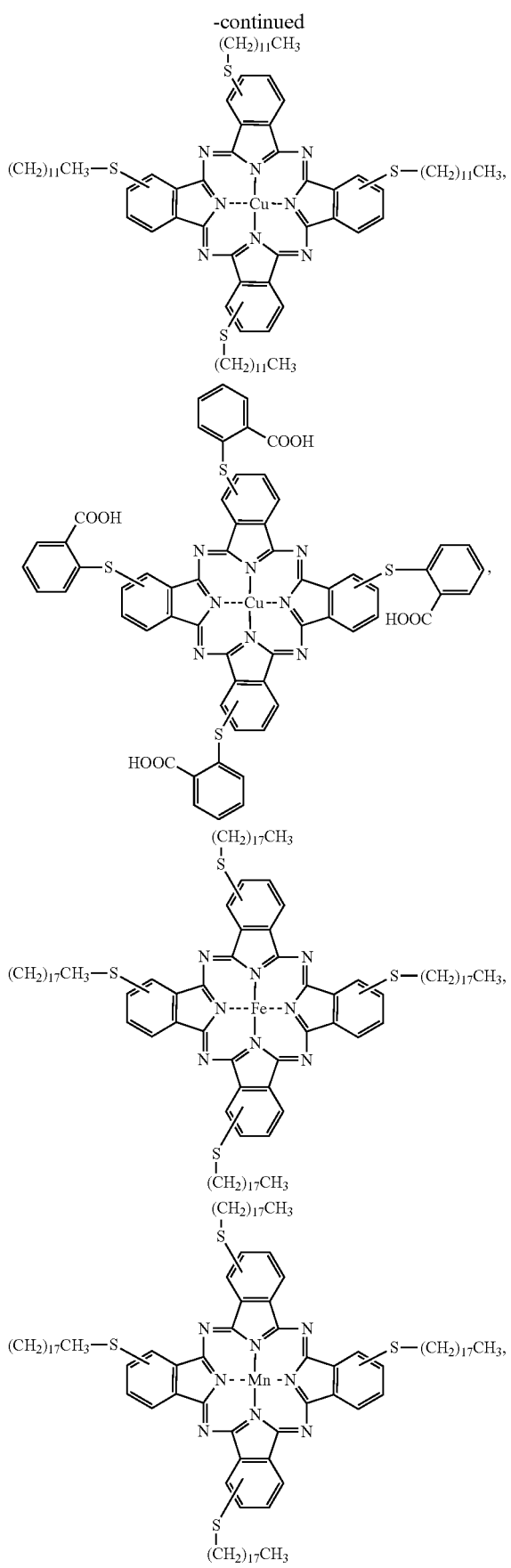

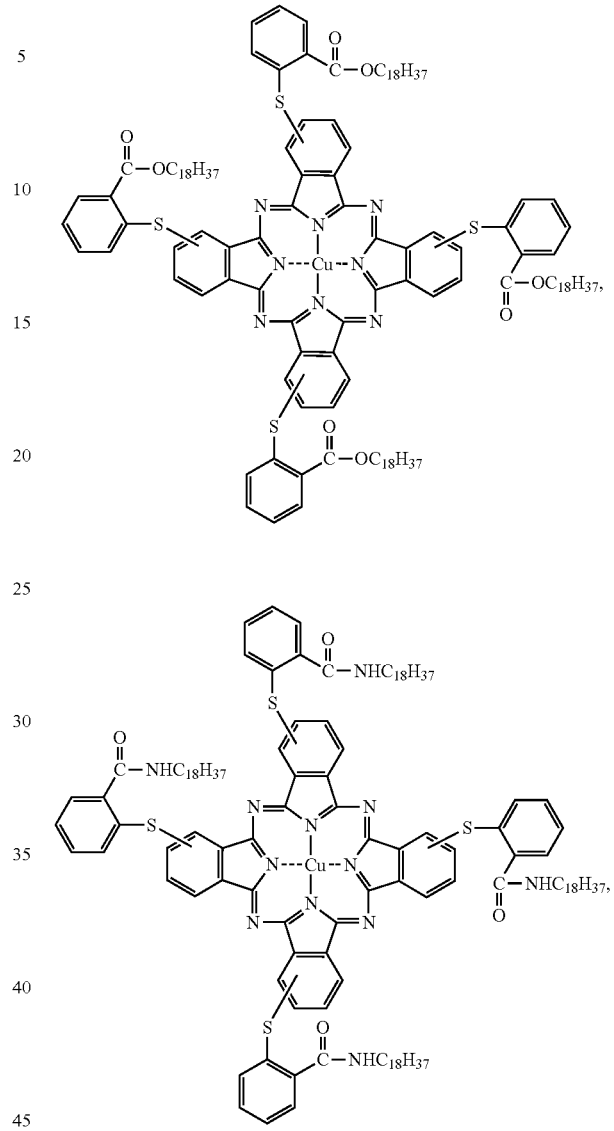

or mixtures thereof.

10. An ink according to claim 1 wherein the phase change ink carrier comprises a monoamide, a branched triamide, a tetra-amide, or a mixture thereof.

11. An ink according to claim 1 wherein the phase change ink carrier comprises (a) a polyethylene wax, (b) a stearyl stearamide wax, (c) a dimer acid based tetra-amide that is the reaction product of dimer acid, ethylene diamine, and a carboxylic acid having at least about 36 carbon atoms, (d) a urethane resin derived from the reaction of two equivalents of hydroabietyl alcohol and one equivalent of isophorone diisocyanate, (e) a urethane resin that is the adduct of three equivalents of stearyl isocyanate and a glycerol-based alcohol.

12. An ink according to claim 1 wherein the phase change ink carrier comprises (a) a polyethylene wax, (b) a stearyl stearamide wax, (c) a branched triamide of the formula

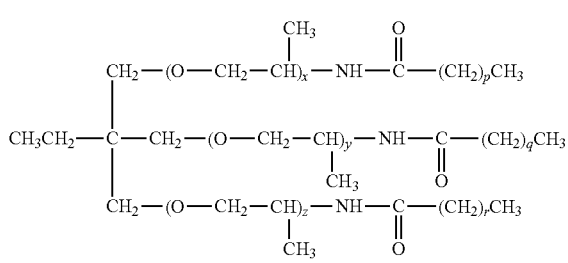

wherein x, y, and z each independently represent the number of propyleneoxy repeat units and x+y+z is from about 5 to about 6, and wherein p, q, and r each, independently of the others, are integers representing the number of repeat —(CH$_2$)— units, wherein p, q, and r have an average value of from about 35, (d) a urethane resin that is the adduct of three equivalents of stearyl isocyanate and a glycerol-based alcohol, and (e) a triglyceride of hydrogenated abietic acid.

13. An ink according to claim 1 wherein the colorant is present in the ink in an amount of at least about 0.1 percent by weight.

14. An ink according to claim 1 wherein the colorant is present in the ink in an amount of no more than about 20 percent by weight.

15. A process which comprises (1) incorporating into an ink jet printing apparatus a phase change ink comprising a phase change ink carrier and a colorant compound of the formula

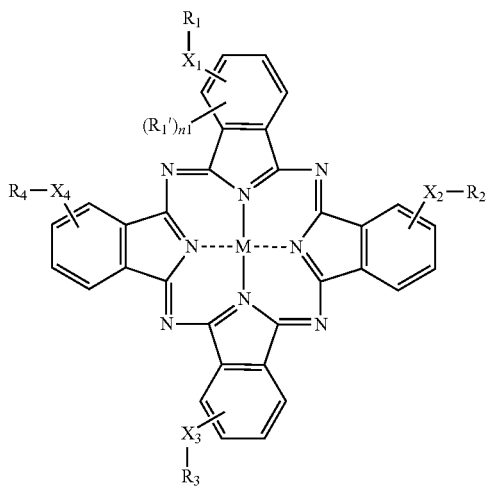

wherein $X_1$, $X_2$, $X_3$, and $X_4$ are each —S—, $R_1$, $R_2$, $R_3$, and $R_4$ each, independently of the others, are alkyl groups, aryl groups, arylalkyl groups, or alkylaryl groups, and M is an atom or group of atoms capable of bonding to the central cavity of a phthalocyanine molecule, wherein axial ligands optionally can be attached to M; (2) melting the ink; and (3) causing droplets of the melted ink to be ejected in an imagewise pattern onto a substrate.

16. A process according to claim 15 wherein the printing apparatus employs a piezoelectric printing process wherein droplets of the ink are caused to be ejected in imagewise pattern by oscillations of piezoelectric vibrating elements.

17. A process according to claim 15 wherein the substrate is a final recording sheet and droplets of the melted ink are ejected in an imagewise pattern directly onto the final recording sheet.

18. A process according to claim 15 wherein the substrate is an intermediate transfer member and droplets of the melted ink are ejected in an imagewise pattern onto the intermediate transfer member followed by transfer of the imagewise pattern from the intermediate transfer member to a final recording sheet.

19. A process according to claim 18 wherein the intermediate transfer member is heated to a temperature above that of the final recording sheet and below that of the melted ink in the printing apparatus.

20. A process according to claim 18 wherein both the intermediate transfer member and the final recording sheet are heated to a temperature below that of the melted ink in the printing apparatus, and wherein the final recording sheet is heated to a temperature above that of the intermediate transfer member and below that of the melted ink in the printing apparatus.

21. A process according to claim 18 wherein both the intermediate transfer member and the final recording sheet are heated to a temperature below that of the melted ink in the printing apparatus, and wherein the intermediate transfer member is heated to a temperature above that of the final recording sheet and below that of the melted ink in the printing apparatus.

* * * * *